United States Patent
Suzuki et al.

(10) Patent No.: US 9,307,301 B2
(45) Date of Patent: Apr. 5, 2016

(54) OPTICAL SWITCH

(75) Inventors: Kenya Suzuki, Atsugi (JP); Kazunori Seno, Atsugi (JP); Naoki Ooba, Atsugi (JP); Toshio Watanabe, Atsugi (JP); Tetsuo Takahashi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 150 days.

(21) Appl. No.: 14/239,771

(22) PCT Filed: Sep. 14, 2012

(86) PCT No.: PCT/JP2012/005920
§ 371 (c)(1),
(2), (4) Date: Feb. 19, 2014

(87) PCT Pub. No.: WO2013/038713
PCT Pub. Date: Mar. 21, 2013

(65) Prior Publication Data
US 2014/0205291 A1 Jul. 24, 2014

(30) Foreign Application Priority Data
Sep. 16, 2011 (JP) ................. 2011-203322

(51) Int. Cl.
*H04Q 11/00* (2006.01)
*G02B 6/35* (2006.01)

(52) U.S. Cl.
CPC .......... *H04Q 11/0003* (2013.01); *G02B 6/3518* (2013.01); *G02B 6/3534* (2013.01)

(58) Field of Classification Search
None
See application file for complete search history.

(56) References Cited

U.S. PATENT DOCUMENTS

| 6,097,859 A | 8/2000 | Solgaard et al. |
| 6,711,316 B2 * | 3/2004 | Ducellier ............... G02B 6/356 385/17 |

(Continued)

FOREIGN PATENT DOCUMENTS

| CN | 1377475 A | 10/2002 |
| EP | 0967524 A2 | 12/1999 |

(Continued)

OTHER PUBLICATIONS

International Search Report of corresponding application No. PCT/JP2012/005920 dated Oct. 1, 2012.

(Continued)

*Primary Examiner* — Darren E Wolf
(74) *Attorney, Agent, or Firm* — Workman Nydegger

(57) ABSTRACT

The discloser provides a multi-input and multi-output optical switch capable of switching over all WDM wavelengths. An optical switch according to one embodiment includes: an optical demultiplexing element (3) that demultiplexes an optical signal from at least one input port into individual wavelengths; a first optical deflection element (5), which deflects an incident optical signal, that deflects the wavelength-separated optical signal incoming from the optical demultiplexing element to change a traveling direction for each wavelength to a switch axis direction perpendicular to a wavelength dispersion axis direction; a second optical deflection element (8) that deflects the optical signal incoming from the first optical deflection element to change the traveling direction to the switch axis direction for output to at least one of the output ports; and an optical multiplexing element (10) that multiplexes the optical signal with the different wavelengths incoming from the second optical deflection element.

14 Claims, 23 Drawing Sheets

(56) References Cited

U.S. PATENT DOCUMENTS

| | | | |
|---|---|---|---|
| 7,440,650 B2 * | 10/2008 | Fondeur | G02B 6/12011 385/16 |
| 8,346,086 B2 * | 1/2013 | Suzuki | G02B 6/12019 398/79 |
| 2003/0021522 A1 | 1/2003 | Ducellier | |
| 2006/0198583 A1 | 9/2006 | Oikawa et al. | |
| 2007/0242953 A1 | 10/2007 | Keyworth et al. | |
| 2008/0031570 A1 | 2/2008 | Fondeur et al. | |
| 2008/0031576 A1 * | 2/2008 | Hudgins | H04B 10/075 385/92 |
| 2008/0298738 A1 | 12/2008 | Ishikawa et al. | |
| 2010/0316385 A1 | 12/2010 | Suzuki et al. | |

FOREIGN PATENT DOCUMENTS

| | | | |
|---|---|---|---|
| JP | 2006-039425 | | 2/2006 |
| JP | 2006-106769 | | 4/2006 |
| JP | 2006-284740 | | 10/2006 |
| JP | 2008-203775 | | 9/2008 |
| JP | 2009-271447 | | 11/2009 |
| JP | 2009-276747 | | 11/2009 |
| WO | 2009104715 | † | 8/2009 |
| WO | WO 2009/104715 | * | 8/2009 |

OTHER PUBLICATIONS

Office Action in corresponding Japanese Patent Application No. 2013-533532 dated Sep. 30, 2014.

International Preliminary Report on Patentability and Written Opinion in corresponding Application No. PCT/JP2012/005920 dated Mar. 18, 2014.

Office Action in corresponding Chinese Application No. 201280040930.9, dated Nov. 3, 2015.

\* cited by examiner
† cited by third party

OPTICAL-PATH DIAGRAM IN
WAVELENGTH AXIS DIRECTION

OPTICAL-PATH DIAGRAM IN
SWITCH AXIS DIRECTION

OPTICAL SWITCH

TECHNICAL FIELD

This invention relates to an optical switch used in a wavelength division multiplexing optical network.

BACKGROUND ART

The capacity of optical communications is progressively increased, then increasing the transmission capacity by a wavelength division multiplexing (WDM) technology. On the other hand, an increase in throughput of the path switching function in a node is strongly desired. In a mainstream method of path switching of wavelength multiplexed channels in the related art, the path switching is performed by use of an electric switch after an optical signal corresponding to each of the transmitted channels has been converted to an electric signal. However, by making full use of the features of an optical signal which is fast and has a wideband, ROADM (Reconfigurable optical add/drop multiplexer) systems are introduced, in which adding, dropping and/or the like are performed with an optical switch and the like for the optical signal corresponding to each channel without OE (optical-to-electrical) and EO (electrical-to-optical) conversion. Specifically, as a network node of an optical ring network, node equipment is provided to add/drop the optical signal corresponding to each channel and to pass the optical signal that does not require a drop operation without OE and EO conversion. The node equipment which performs adding, dropping and/or the like on an optical signal corresponding to each channel without OE and EO conversion has the advantages of small size and low power consumption. A wavelength selective switch module is desired as a device required for the future development of these ROADM systems.

In particular, the need for the multi-input multi-output wavelength selective switch as optical switches interconnecting a plurality of ROADM systems is increasing. This corresponds to a ROADM configuration called CDC (Colorless Directionless Contentionless), which is expected to be applied to next generation networks. In response to such demands, an M×N wavelength selective switch having an MEMS (Mechanical-Electro Machine System) is known (see, for example, PTL 1). The wavelength selective switch having a LCOS (Liquid Crystal On Silicon) is allowed to flexibly re-locate a wavelength grid, increasing the wavelength use efficiency.

FIG. 18 is a schematic diagram of a wavelength selective switch disclosed in PTL 1. In FIG. 18, an optical signal incident from an input optical fiber 101 is converted into parallel light by a convex lens 103, then is demultiplexed into wavelengths by a diffraction grating 104, and then focused onto a MEMS mirror array 106a by a convex lens 105. The optical signal is reflected for each wavelength by the MEMS mirror array 106a to be reflected by a total reflection mirror 402 via a convex lens 401. The optical signal thus reflected is incident on a MEMS mirror array 106b via the convex lens 401 again, so that the optical path is changed, thus outputting the optical signal to an output optical fiber 102 through the convex lens 105, the diffraction grating 104 and the convex lens 103. FIG. 19 is a diagrammatic illustration of a light beam in a switch axis direction. In the configuration in FIG. 19, the same 4f system (f is a focal length of the convex lens 401) is set between the MEMS mirror arrays 106a and 160b and the total reflection mirror 402 in both a wavelength dispersion axis direction of the diffraction grating 104 and a switch axis direction perpendicular to the wavelength dispersion axis direction. The reason why the 4f system is set is that a position of a beam waist is determined at both the MEMS mirror arrays 106a and 106b as parallel beams in both the wavelength dispersion axis direction and the switch direction on the reflection mirror 402. Such an optical system, even if two mirror elements 107a and 107b are tilted at any angle, the light absolutely returns to the mirror element 107, making switching impossible. To solve this problem, the wavelength selective switch disclosed in PTL 1 involves the necessity to form the reflection mirror 402 in a blazed shape 1200 that is complicated and has poor productivity, as shown in FIG. 20. As shown in FIG. 21, there is considered a method of forming the reflection mirror 402 in a curved shape to implement switching. However, the advantages of adopting the foregoing 4f system (point of forming the beam waist on the MEMS mirror arrays 106a and 106b) are traded off for this method.

The configuration of the wavelength selective switch illustrated in FIG. 18, FIG. 19 and FIG. 20 has the advantages that:

(1) components can be set such that the position of the beam waist is to be formed on the MEMS mirror arrays 106a and 106b for an increase in the reflection efficiency; and (2) the MEMS mirror arrays 106a and 106b can be placed on the same plane.

FIG. 22 is a diagram showing a schematic configuration of a wavelength selective switch disclosed in PTL 1 as well. In FIG. 22, optical signals from input optical fibers 101 enter the MEMS mirror array 106a via spherical lenses 601 placed for individual input ports and cylindrical lenses 602. The optical signal after the optical path has been changed by the MEMS mirror array 106a is reflected through a convex lens 603 by a total reflection mirror 604 as in the case of the description with reference to FIG. 18. The optical signal reflected by the total reflection mirror 604 passes through the convex lens 603, the MEMS mirror array 106b, the cylindrical lens 602 and the spherical lens 601 to be coupled to the output optical fiber 102 again.

CITATION LIST

Patent Literature

PTL 1: JP Patent No. 4493538 (FIGS. 4-1, 4-2, 6-1)

SUMMARY OF INVENTION

Technical Problem

However, the M×N wavelength selective switch described in PTL 1 has the following technical problems.

(1) In the optical system in FIG. 18, by using the reflection mirror 402, an image in the wavelength axis direction (x direction) is reversed in the shorter and longer wavelengths. Therefore, the wavelength components do not transmit the system except for the wavelength component that is incident on the reflection mirror perpendicularly.

(2) In the optical system in FIG. 19, since the incident on the diffraction grating 104 is made at different angles between the signals from different input (output) ports in the switch axis direction (y direction), the grating functions as it has different depths for those signals. Therefore, an optical signal from each port has different dispersion characteristics, leading to degradation in transmission band.

(3) In the optical system shown in FIG. 20, the use of a mirror of a complicated shape with difficulty in producing is necessary, leading to deterioration in productivity and cost of the device.

(4) In the optical system shown in FIG. 22, since all the input optical signals are incident on the diffraction grating 103 at the same angle, the problem described in the foregoing (2) in the optical system in FIG. 19 is eliminated. However, if a long focal length of the cylindrical lens 602 is required to obtain a sufficient wavelength resolution, the beam diameter w1 which is determined by the spherical lens 601 just after exit from the spherical lens is required to be sufficiently increased. If the beam diameter w1 does not have an adequate length, due to beam divergence in the switch axis direction, the optical signal enters into an adjacent mirror on the MEMS mirror in the switch axis direction, giving rise to a problem of deterioration of performance in port-to-port crosstalk.

Hereinafter, a numerical example will be shown. It is assumed that a generally available 940 line/mm diffraction grating is used in a Littrow arrangement and the wavelength grid switches the optical signal of 50 GHz-spacing.

For the purpose of obtaining a sufficient transmission band, as shown in FIG. 23, a beam diameter w2 (diameter of a beam) of an optical signal on an MEMS mirror 107 in the MEMS mirror array 106 is preferably equal to or less than one tenth of the width wMWL of the MEMS mirror in the wavelength direction (x direction). For example, assuming that the width wMWL of the MEMS mirror is 200 μm, the beam diameter w2 of the optical signal may be advisably the order of 20 μm.

Incidentally, since the mirror width wMWL of 200 μm corresponds to a wavelength range of 50 GHz, the focal length f of the cylindrical lens 602 is required to be about 400 mm with consideration to the angular dispersion of the diffraction grating 103. Thus, if w2=20 μm, a radius of Gaussian beam generated on the spherical lens 601 will be considerably large, w1=9.5 mm.

In the switch axis direction, in order to propagate without a change in beam diameter and sufficiently accept a Gaussian beam of a w1=9.5 mm radius, the MEMS mirror is required to have a size about three times as large as the Gaussian beam. Thus, an MEMS mirror with a very high aspect ratio of 200 μm×28 mm will be required. Further, the mirror is required to be rotated in the direction of 28 mm. It is clear that such a very large mirror is impractical.

In addition, individually implementing the spherical lenses 601 to the leading ends of the fibers gives rise to a problem of an extreme increase in the degree of difficulty in implementation.

Solution to Problem

According to the present invention, to attain such an object, a first aspect of the present invention provides an optical switch including at least one input port and at least one output port, which comprises: an optical demultiplexing element that demultiplexes an optical signal from the at least one input port into wavelength-separated optical signals; at least one first optical deflection element that deflects the wavelength-separated optical signal incoming from the optical demultiplexing element to change a traveling direction for each wavelength; a second optical deflection element that deflects the optical signal incoming from the first optical deflection element to be output to at least one of the output ports; and an optical multiplexing element that multiplexes the wavelength-separated optical signals with the different wavelengths incoming from the second optical deflection element, wherein the first optical deflection element and the second optical deflection element deflect the incident optical signal in a switch axis direction perpendicular to a wavelength dispersion axis direction of the optical demultiplexing element and the optical multiplexing element.

A second aspect of the present invention is that, in the optical switch according to the first aspect, at least one of the first optical deflection element and the second optical deflection element includes a spatial phase modulation element having a plurality of microscopic phase modulation elements.

A third aspect of the present invention is that, in the optical switch according to the first or second aspect, the first optical deflection element and the second optical deflection element are formed of liquid-crystal elements each having phase distribution forming a curved surface in the switch axis direction, and a beam waist of the optical signal exists in a position located midway between the first optical deflection element and the second optical deflection element.

A fourth aspect of the present invention is that, in the optical switch according to the first or second aspect, the first optical deflection element and the second optical deflection element are formed of liquid-crystal elements each reflecting the input light, and a reflecting surface of each of the first optical deflection element and the second optical deflection element has phase distribution forming a curved surface in the switch axis direction, and a beam waist of the optical signal exists in a position located midway between the first optical deflection element and the second optical deflection element.

A fifth aspect of the present invention is that, in the optical switch according to the first or second aspect, each of the first optical deflection element and the second optical deflection element includes a MEMS mirror array with each mirror having a curvature in the switch axis direction, and a beam waist of the optical signal exists in a position located midway between the first optical deflection element and the second optical deflection element.

A sixth aspect of the present invention is that the optical switch according to any of the first to fourth aspects includes: at least one first optical element that converts all of the optical signals incoming from the at least one input port into parallel light in the wavelength dispersion axis direction; at least one second optical element that converts a shape of beam in all of the optical signals incoming from the at least one input port to form parallel light in the switch axis direction; at least one third optical element that changes the optical signal incoming from the optical demultiplexing element to convergent light in the wavelength dispersion axis direction to form a beam waist in the wavelength dispersion axis direction on the first optical deflection element; at least one fourth optical element that changes the optical signal incoming from the first optical deflection element to parallel light in the wavelength dispersion axis direction; at least one fifth optical element that changes the optical signal incoming from the fourth optical element to convergent light in the wavelength dispersion axis direction to form a beam waist in the wavelength dispersion axis direction on the second optical deflection element; at least one sixth optical element that changes the optical signal incoming from the second optical deflection element to parallel light in the wavelength dispersion axis direction; at least one seventh optical element that converts all of the optical singles from the optical multiplexing element to convergent light in the wavelength dispersion axis direction, and converts a shape of beam to be coupled to at least one of the output ports; and at least one eighth optical element that converts all of the optical singles from the optical multiplexing element to allow a main light beam of the optical signal to converge in the switch axis direction for conversion of an optical path to be coupled to at least one of the output ports.

A seventh aspect of the present invention is that, in the optical switch according to the sixth aspect, each of the first optical deflection element and the second optical deflection element includes an optical deflection element that reflects the input light, the third optical element is shared with the fourth optical element, and the fifth optical element is shared with the sixth optical element.

An eighth aspect of the present invention is that, in the optical switch according to the seventh aspect, a ninth optical element is placed between the third optical element shared with the fourth optical element and the fifth optical element shared with the sixth optical element to invert and reflect an image of the optical signal in the wavelength axis direction, the third optical element shared with the fourth optical element is also shared with the fifth optical element and the sixth optical element.

A ninth aspect of the present invention is that, in the optical switch according to the eighth aspect, the third optical element, the fourth optical element, the fifth optical element and the sixth optical element are formed of the same optical element reflecting the input optical signal.

A tenth aspect of the present invention is that, in the optical switch according to any of the sixth to ninth aspects, the first optical element and the second optical element input each of the optical signals incident from the at least one input port into the optical demultiplexing element at the same angle.

An eleventh aspect of the present invention is that, in the optical switch according to any of the sixth to tenth aspects, the first optical element, the second optical element, the third optical element, the fourth optical element, the fifth optical element and the sixth optical element each input the optical signal to be sent to the at least one output port, into the optical multiplexing element at the same angle for the same wavelength.

A twelfth aspect of the present invention is that, in the optical switch according to any of the first to eleventh aspects, the at least one input port and the at least one output port are connected respectively to optical-beam forming devices including optical waveguides formed on a substrate, wherein the optical-beam forming device includes connection waveguides the number of which is equal to the number of the input ports or the number of the output ports, a first slab waveguide connected to the connection waveguides, array waveguides connected to the first slab waveguide and having an optical path difference which is small to such an extent that interference characteristics in a signal wavelength band are negligible, and a second slab waveguide connected to the array waveguides, wherein a surface of the substrate is placed in a direction parallel to the switch axis, and a length of the second slab waveguide in an optical axis direction is set in a fixed position from an output end of the optical waveguide.

A thirteenth aspect of the present invention is that, in the optical switch according to any of the first to eleventh aspects, the at least one input port and the at least one output port are each connected to an optical-beam forming device including optical waveguides formed on a substrate, wherein the optical-beam forming device includes connection waveguides the number of which is equal to the number of the input ports or the number of the output ports, a first slab waveguide connected to the connection waveguides, array waveguides connected to the first slab waveguide and having an optical path difference which is small to such an extent that interference characteristics in a signal wavelength band are negligible, and a second slab waveguide connected to the array waveguides, wherein a surface of the substrate is placed in a direction parallel to the switch axis, and a boundary between the array waveguides and the second slab waveguide is formed of a curved surface.

A fourteenth aspect of the present invention is that, in the optical switch according to the twelfth or thirteenth aspect, a connection point line between the connection waveguides and the first slab waveguide differs between an input optical beam forming device which is formed of the optical beam forming device to which the input ports are connected, and an output optical beam forming device which is formed of the optical beam forming device to which the output ports are connected, wherein points constituting the connection point line in the output optical beam forming device are placed in a midpoint position between points of the connection point line in the input optical beam forming device.

Advantageous Effects of Invention

As described above, the present invention implements a multi-input and multi-output wavelength selective optical switch, contributing to implementation of the next-generation network. As shown in point (1) in "Technical Problem", the wavelength selective switches disclosed until now are capable of switching of only the specific wavelength (center wavelength). However, the wavelength selective switch of the configuration according to the present invention is capable of switching over all the WDM wavelengths.

As shown in point (2) in "Technical Problem", since the wavelength selective switch of the configuration according to the present invention is capable of equalizing input angles to the diffraction grating among all the optical signals from the input port, this allows all the input optical signals to obtain absolutely equivalent spectral properties.

In addition, as shown in point (3) in "Technical Problem", the wavelength selective switch of the configuration according to the present invention eliminates the necessity to use an optical deflection element (MEMS mirror array) having an impracticable size.

The wavelength selective switch of the configuration according to the present invention appropriately employs a waveguide-type front-end optical system to implement a flat beam which is essential to use of LCOS, increasing the degree of freedom in the design of the optical system and also avoiding the degradation in crosstalk caused by the zero-order light of LCOS.

DESCRIPTION OF EMBODIMENTS

According to the present invention, a multi-input multi-output optical switch capable of switching over the entire WDM wavelength is provided. Embodiments according to the present invention will be described below in detail with reference to the drawings. The same components are designated by the same reference signs for description.

Embodiment 1

Figure 1:
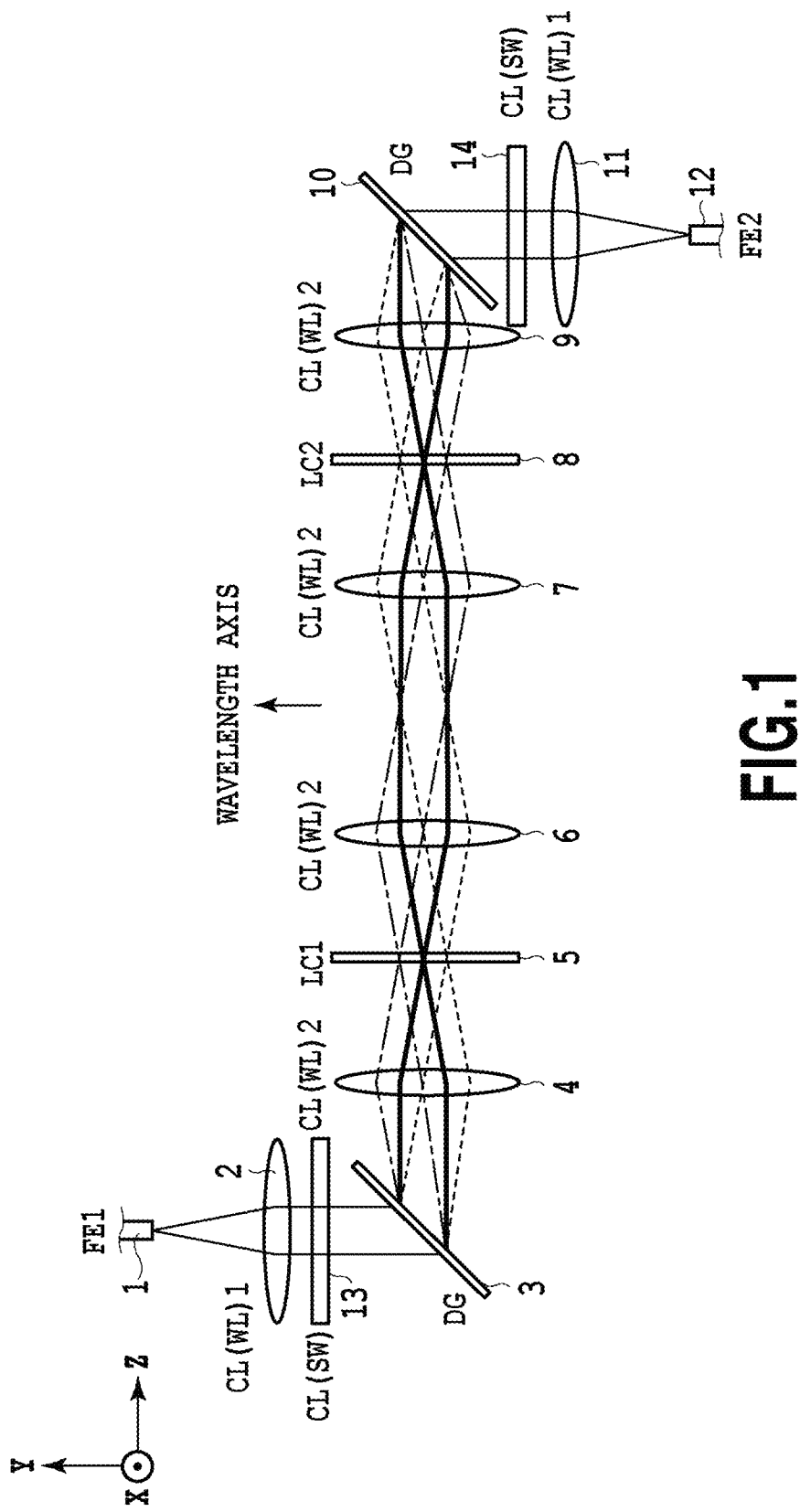
FIG. 1 is a schematic diagram illustrating an optical system in a wavelength axis direction of an optical switch of one embodiment according to the present invention.
Figure 2:
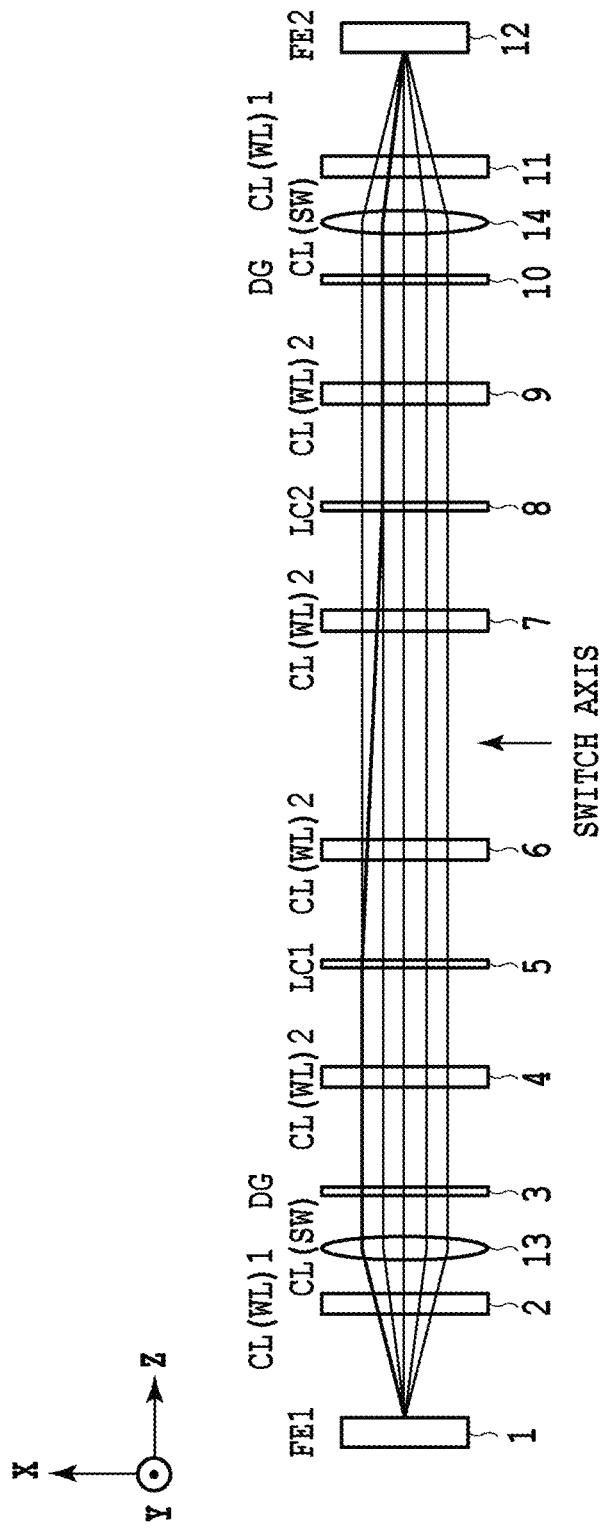
FIG. 2 is a schematic diagram illustrating an optical system in a switch axis direction of an optical switch of one embodiment according to the present invention.

An embodiment of an optical switch according to the present invention will be described with reference to FIGS. 1 and 2. FIGS. 1 and 2 each show a schematic diagram of an optical system of the optical switch according to the present embodiment.

FIG. 1 shows a schematic diagram of a wavelength axis direction of the optical switch according to the present embodiment. In FIG. 1, three optical signals of different wavelengths are indicated by the three lines (thick solid line, dotted line, and dashed-dotted line). The following description will be made focusing on only the thick solid line.

An optical signal that is output from a front-end optical element 1 is converted into parallel light through a collimator lens 2, then enters a diffractive optical element 3 for wavelength separation. In the diffractive optical element 3, the input optical signal diffracted is diffracted in different directions from wavelength to wavelength (is demultiplexed into three lines represented as the thick solid line, dotted line, and dashed-dotted line). The diffracted optical signal is converted into convergent light by a condenser lens 4, which then enters an optical deflection element 5 (incident on different positions from optical signal to optical signal). As described later, the optical deflection element is capable of deflecting input light in a direction perpendicular to a wavelength dispersion axis direction (referred to as simply a "wavelength axis"). The direction perpendicular to the wavelength axis refers to an x direction in the optical deflection element 5. The optical deflection element 5 may be a reflection type that deflects input light by means of reflection or a transmission type that deflects input light by means of transmission. Here, the present embodiment is described assuming that the optical deflection element 5 is of the transmission type that deflects the input light as a transmitted light. It is evident that, even if the optical deflection element 5 of the reflection type is used, the same function will be exerted.

The optical signal passing through the optical deflection element 5 is converted into parallel light through a collimator lens 6, and then is converted into convergent light at a condenser lens 7 again. Preferably, between the collimator lens 6 and the condenser lens 7, the optical signal is converted into parallel light with a sufficient diameter for propagation between them. The optical signal that is converted into the convergent light by the condenser lens 7 is concentrated onto an optical deflection element 8 for each wavelength (thick solid line, dotted line, and dashed-dotted line). The optical signal that is concentrated on the optical deflection element 8 is deflected in the direction (x direction) perpendicular to the wavelength axis direction (y direction) for each wavelength. Here, as in the case of the optical deflection element 5, the optical deflection element 8 is described as a transmission element, but generality is not lost. The optical signal passing through the optical deflection element 8 propagates as divergent light, which is then converted into parallel light by a collimator lens 9 again. The optical light that is converted into the parallel light is incident on a diffractive optical element 10 at different angles from wavelength to wavelength, then consequently is wavelength-multiplexed, and then output in the same direction.

Here, the diffractive optical elements 3 and 10 are placed such that the rotation direction about the grating direction of them is set to a direction in which the optical signal demultiplexed into wavelengths by the diffractive optical element 3 is multiplexed into wavelengths by the diffractive optional element 10 as shown in FIG. 1.

The optical signal that is output from the diffractive optical element 10 becomes convergent light through a condense lens 11, which finally enters a front-end optical element 2. An optical path indicated by a thick line in FIG. 1, which shows a flow of the optical signal in the wavelength direction, represents propagation of divergent, convergent or parallel light of the Gaussian beam that is output from the front-end optical system 1. The collimator lenses 2, 6, and 9 and the condenser lenses 4, 7, and 11 are cylindrical lenses each having power only in the wavelength axis direction (concentrating light components in the wavelength axis direction, having no effects on components in the switch axis direction, and having refractive power).

FIG. 2 is a schematic diagram of an optical system in the switch axis direction of the optical switch according to the present embodiment. The switch axis direction refers to the x direction in the optical deflection element 5. It should be noted that FIG. 1 schematically shows the cylindrical lenses 2, 4, 6, 7, 9, and 11, the diffractive optical elements 3 and 10 and the optical deflection elements 5 and 8, but the directions in which the diffractive optical elements 3 and 10 are placed differ from the condition in FIG. 1 for the sake of briefly describing only the operation in relation to the switch axis.

The light beam shown in FIG. 2 refers to a main ray of the light beam coupled to each of the input/output ports in the switch axis direction, in which the case of 5 inputs and 5 outputs is shown. In particular, the thick line in FIG. 2 is an optical signal incident from an input port 1, in which the case where the optical signal is coupled to an output port 2 is shown.

The optical signal that is output from the front-end optical element 1 is output in different directions from the front-end optical element 1, depending on the incident port. The optical signal that is output from the front-end optical system 1 is changed in an optical path by a collimator lens 13 placed at the preceding stage of the diffractive optical element 3 such that the light beam corresponding to each incident port becomes in parallel. Thus, all the light beams are incident at the same angle on the diffractive optical element 3. Each light beam the optical path of which is changed for each wavelength by the diffractive optical element 3 enters the optical deflection element 5 via the condenser lens 4. The optical deflection element 5 deflects the input light beam in a different direction (x direction) for each wavelength. For example, after propagating in an arbitrary direction as shown by the thick line, the light wave deflected by the optical deflection element 5 enters the optical deflection element 8 via the collimator lens 6 and the condenser lens 7. The signal incident on the optical deflection element 8 is deflected in a direction corresponding to a desired output port (for example, the direction shown by the thick line), and then enters the diffractive optical element 10 via the collimator lens 9. The entry of all the light beams into the diffractive optical element 10 at the same angle irrespective of the input/output port is the same as the conditions for the diffractive optical element 5. The light wave passing through the diffractive optical element 10 is changed in an angle by the condenser lens 14 and then enters the front-end optical element 12 via the condenser lens 11.

It can be seen that switching from input 1 to output 2 takes place, if the thick line is traced from the front-end optical element 1 to the front-end optical element 12 in the foregoing description.

Here, the collimator lens 13 and the condenser lens are formed of cylindrical lenses each having power (refractive power) only in the switch axis direction (x direction). The example of placing the collimator lens 13 at the subsequent stage of the collimator lens 2 is shown, but the collimator lens 2 may be placed at the subsequent stage of the collimator lens 13. Likewise, instead of the placement of the condenser lens 11 at the subsequent stage of the condenser lens 14, the condenser lens 14 may be placed at the subsequent stage of the condenser lens 11.

The foregoing optical system paraxially meets the following three limiting conditions. That is:

(1) an optical signal enters the diffractive optical elements 3 and 10 as parallel light;

(2) the optical signals corresponding to all the input/output ports are incident at the same angle to the diffractive optical elements 3 and 10; and (3) the direction in which the diffractive optical element 3 and 10 are placed is determined as a direction in which the optical signal wavelength-demultiplexed at the former is wavelength-multiplexed at the later.

The foregoing condition (1) is for multiplex/demultiplex of wavelengths by the diffractive optical element. Upon the entry of convergent light or divergent light into diffraction grating, considering in terms of light beams making up the beam, the incident angle on the diffractive optical element varies according to the light-beams. Therefore, since the diffractive direction varies according to the light-beams, the wavelength selectivity on the optical deflection elements 5 and 8, that is, transmission bandwidth and loss, is degraded.

The limiting condition of the above (2) also relates to the wavelength selectivity of the optical switch. For example, if the optical signals from the different input ports are incident at different angles in the switch axis direction, the grating depth of the diffraction grating varies. Therefore, the diffraction gratings, which are different in wavelength dispersibility, are placed from input port to input port, so that, when the wavelength demultiplexing is performed on the diffractive optical element, the demultiplexed optical signals are concentrated respectively on different positions. As a result, in the case of deflecting the input light at the optical deflection element 5 in the switch axis direction, when the deflected light is re-concentrated on the optical deflection element 8, it is re-concentrated on a relatively different position from the position of the optical deflection element 5 on which it was concentrated. In other words, since this is directly linked to a difference between the entry angles of light into the diffractive optical element 10, the wavelength multiplexing at the diffractive optical element 10 does not appropriately function.

Figure 18:
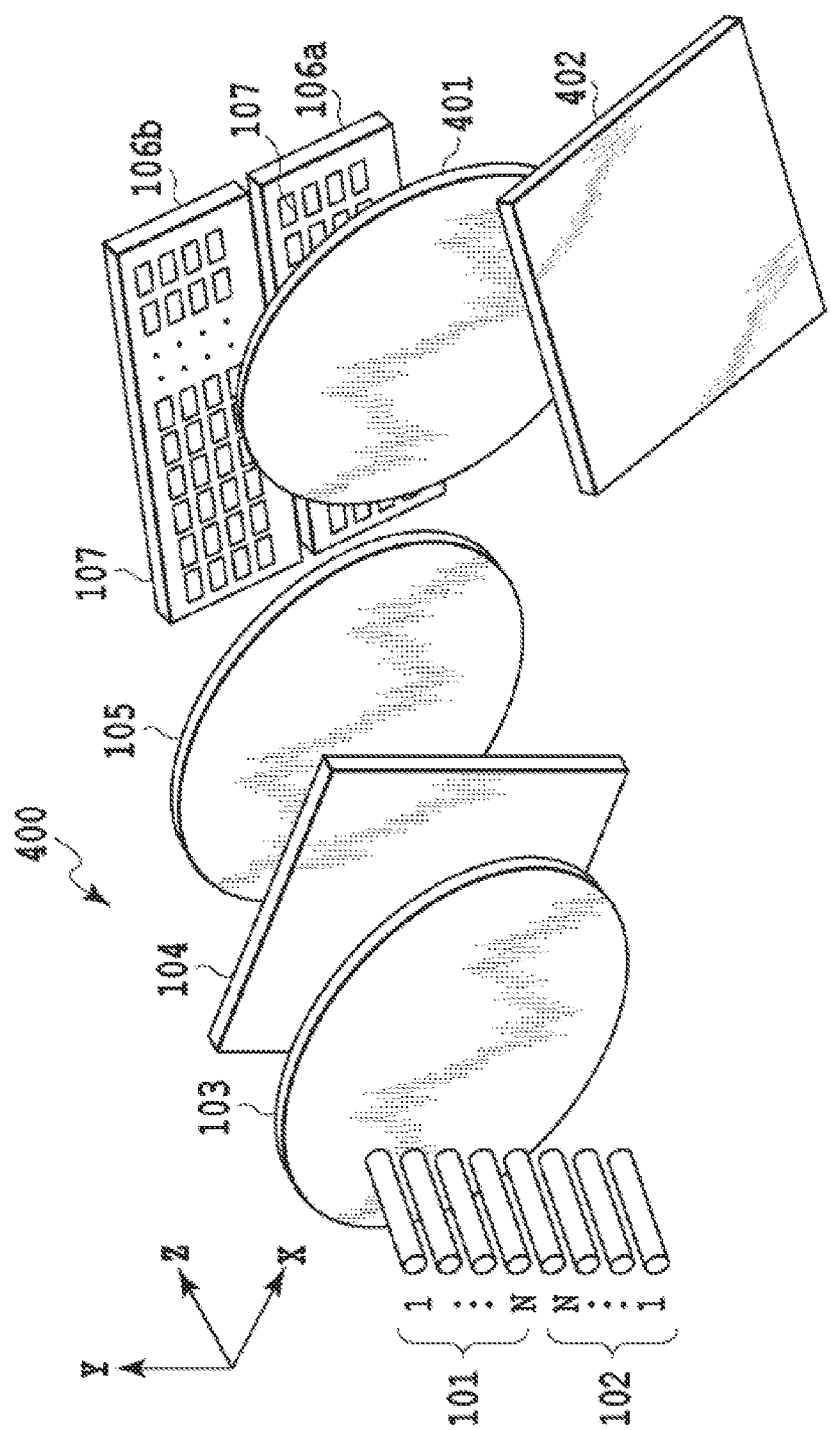
FIG. 18 is a schematic diagram showing the configuration of the wavelength selective switch disclosed in PTL 1.
Figure 19:
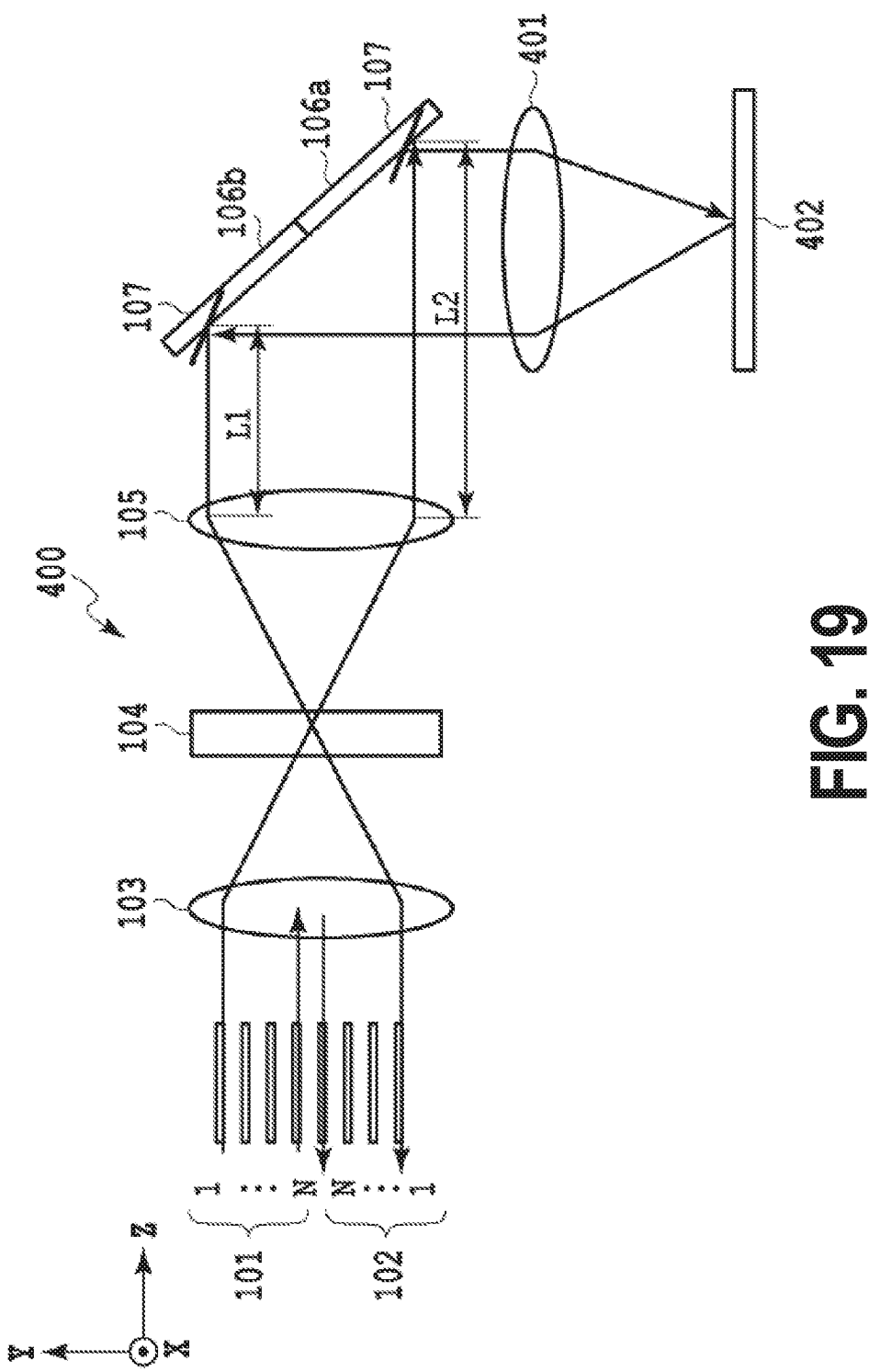
FIG. 19 is an illustration of a light beam in the wavelength selective switch disclosed in PTL 1 (Y-axis direction=switch axis direction)
Figure 20:
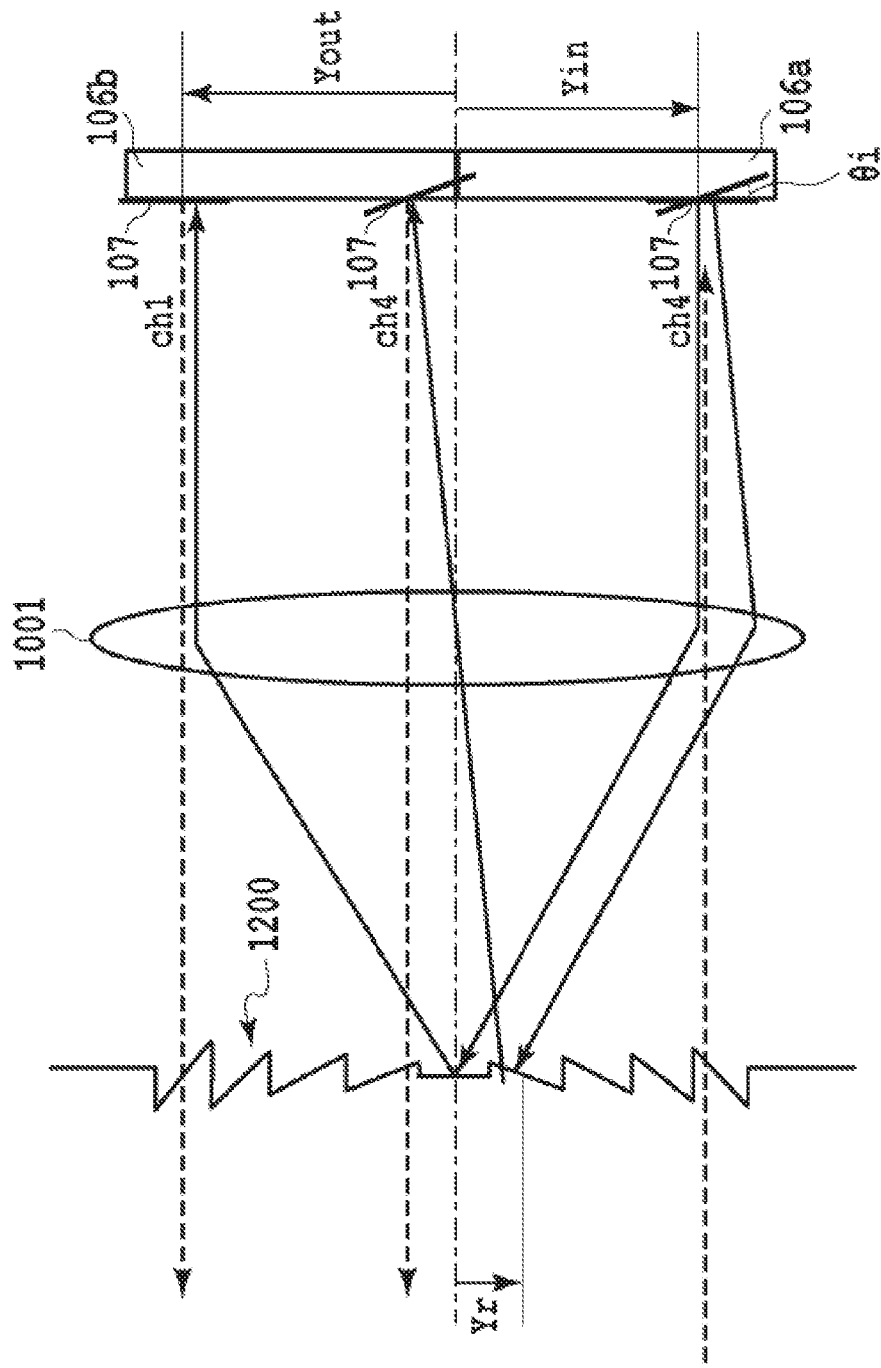
FIG. 20 is a diagram illustrating the configuration of a reflection mirror and the optical system of the wavelength selective switch disclosed in PTL 1.
Figure 21:
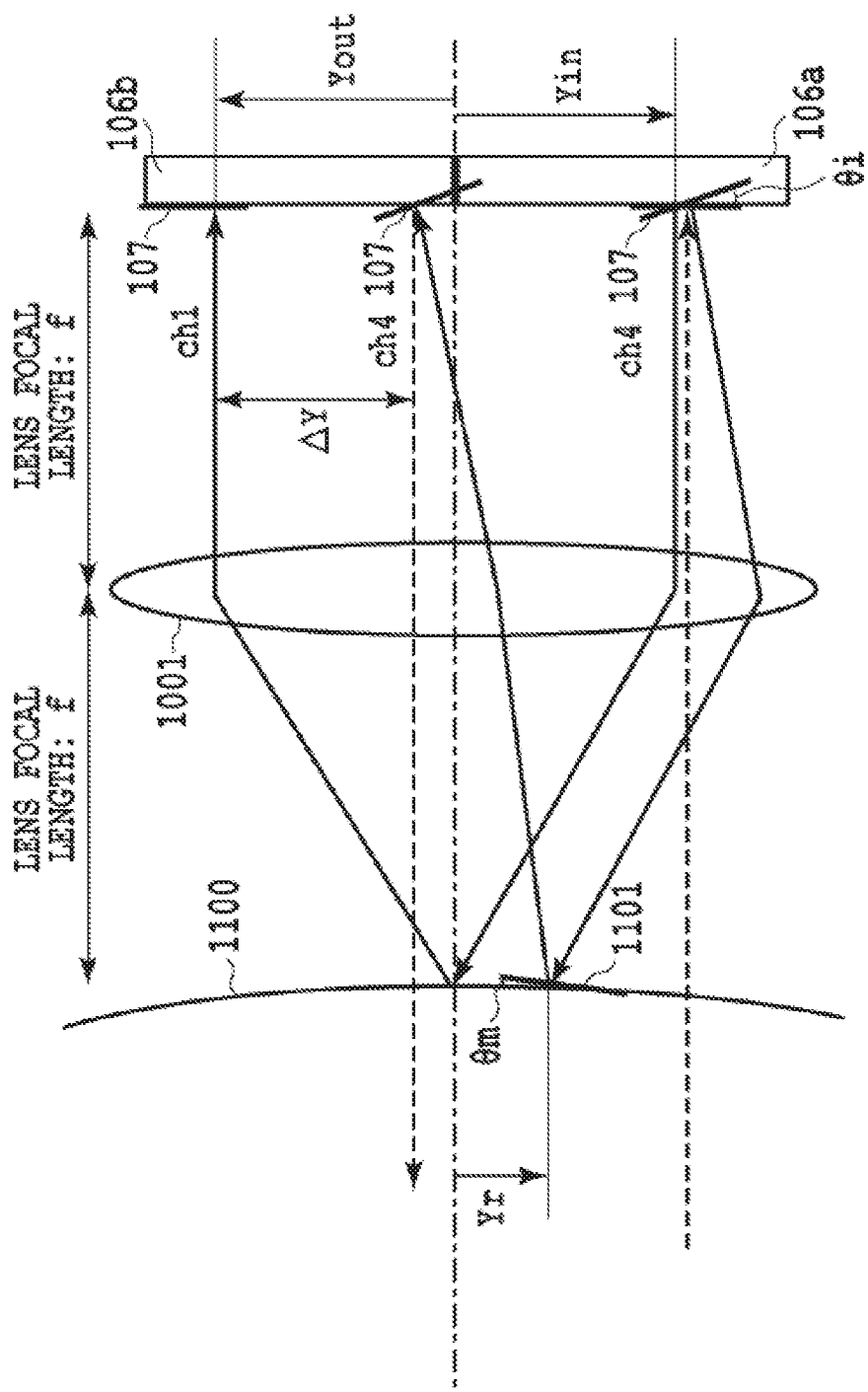
FIG. 21 is diagram illustrating the configuration of a reflection mirror and the optical system of the wavelength selective switch disclosed in PTL 1.
Figure 22:
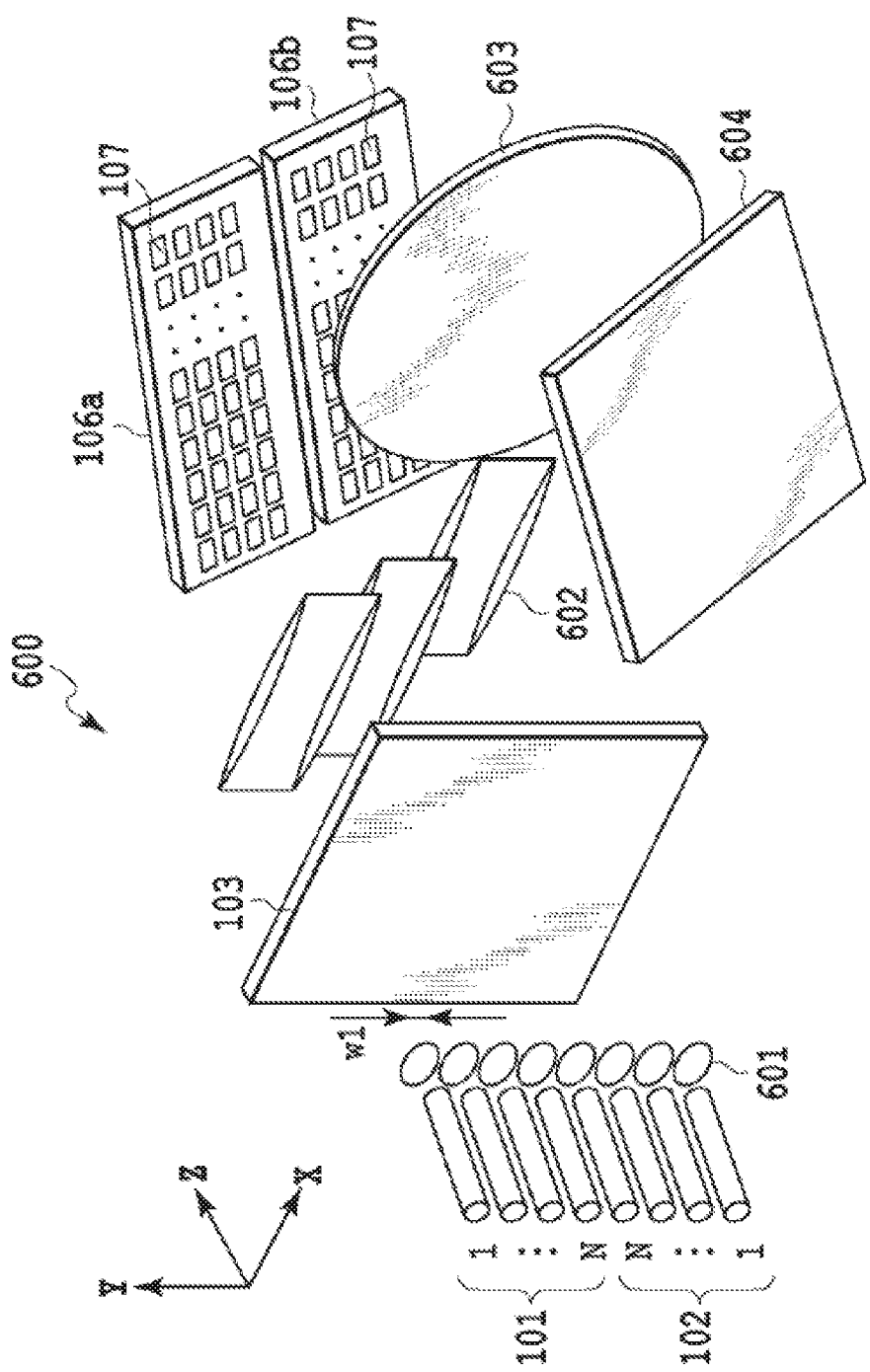
FIG. 22 is a schematic diagram showing the configuration of the wavelength selective switch disclosed in PTL 1.
Figure 23:
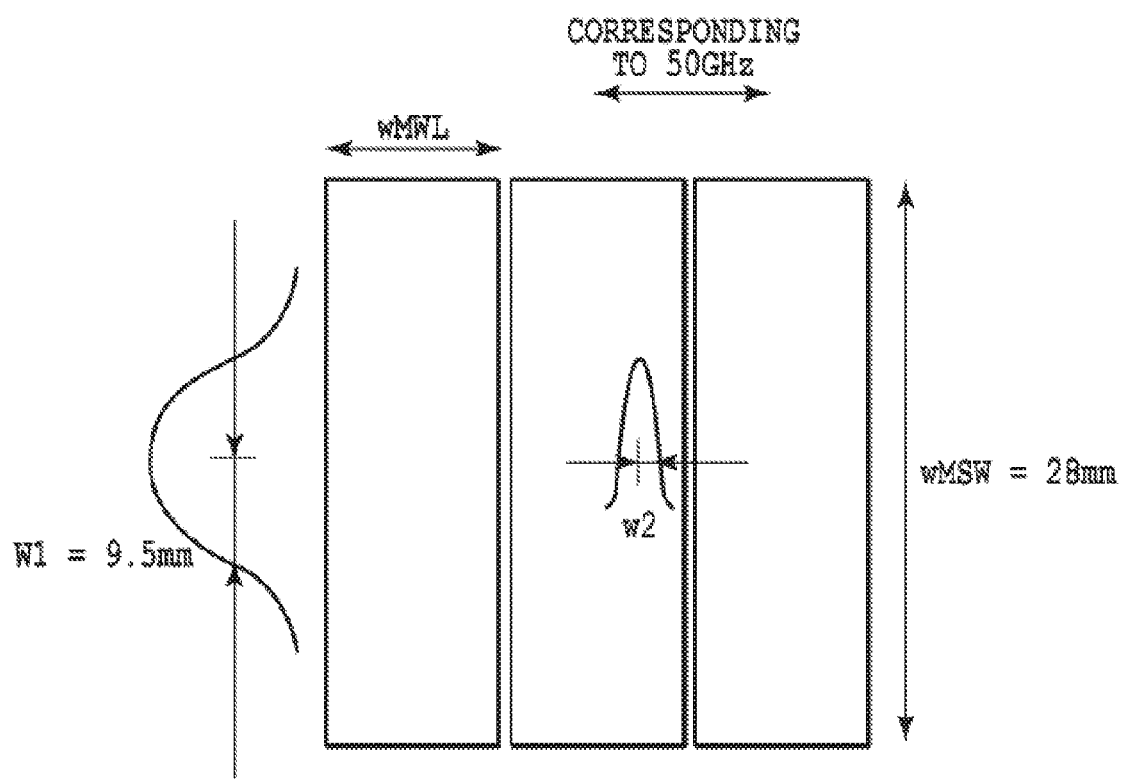
FIG. 23 is a diagram illustrative of the relationship between an MEMS mirror 107 and a beam diameter w2 of an optical signal in the configuration of the wavelength selective switch disclosed in PTL 1.

The third limiting condition is essential for implementing a basic function of wavelength-selectively switching the wavelength-multiplexed input signal. The configuration shown in FIG. 4-1 and FIG. 6-1 in PTL 1 (FIGS. 18 and 20 in the present application) does not meet these requirements.

As the optical deflection elements 5 and 8, a LCOS optical deflection element, an MEMS optical deflection element and the like can be employed. As the diffraction grating, a transmission-type or reflection-type ruled diffraction grating, a volume holographic diffraction grating and the like can be employed.

The present embodiment shows the example of placing the cylindrical lens 13 between the cylindrical lens 2 and the diffractive optical element 3. However, the cylindrical lens 13 may be placed closer to the input than the diffractive optical element 3, and therefore may be placed between the front-end optical element 1 and the cylindrical lens 2.

Likewise, the cylindrical lens 14 is placed between the diffractive optical element 10 and the cylindrical lens 11. However, the cylindrical lens 14 is only required to be placed closer to the output than the diffractive optical element 10, and therefore may be placed between the cylindrical lens 11 and the front-end optical element 12.

The following is a numerical example of the optical switch according to the present embodiment. The present embodiment shows the example of employing a transmission-type ruled diffraction grating as the diffractive optical element and employing a LCOS (Liquid Crystal On Silicon)-based diffractive optical element as the optical deflection element. The wavelength of the signal light is a C band ranging from 1530 nm to 1565 nm. In the numerical example, the case of 5 inputs and 5 outputs is shown as an example.

The aforementioned optical components are:

focal length of each of the cylindrical lenses 2 and 11: 34 mm, focal length of each of the cylindrical lenses 4, 6, 7, and 8: 143 mm, focal length of each of the cylindrical lenses 13 and 14: 50 mm, and lattice constant of each of the diffractive optical elements 3 and 10: 940 Lines/mm.

The adopted LCOS has pixels of width W×height H=1024× 768 at a 11-μm pixel pitch.

Figure 3:
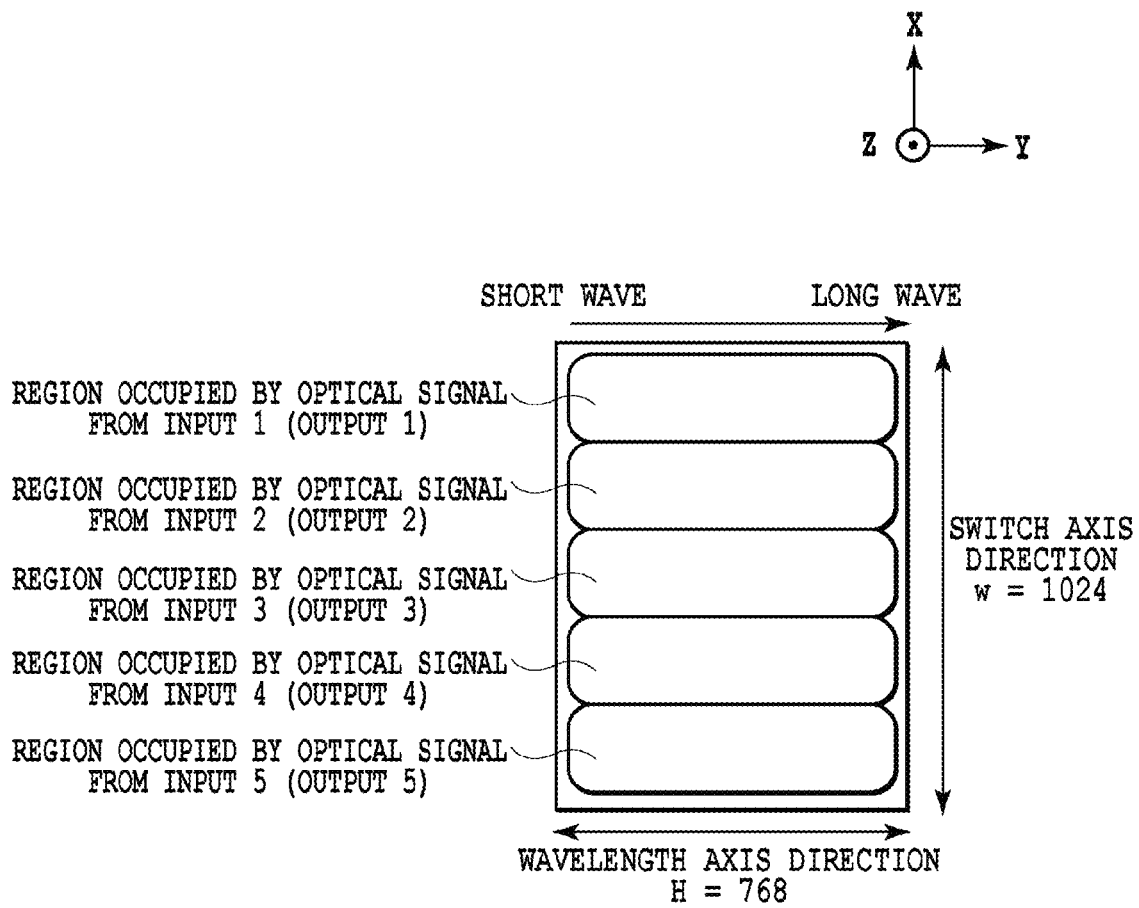
FIG. 3 is a diagram illustrating a beam arrangement on LCOS when the LCOS is used as an optical deflection element.

FIG. 3 shows the arrangement of the beams on the LCOS.

Here, the LCOS is placed with its short side extending in a direction corresponding to the wavelength axis (x axis). In the above setting, an optical frequency of 100 GHz corresponds to approximately 16 pixels.

Figure 4:
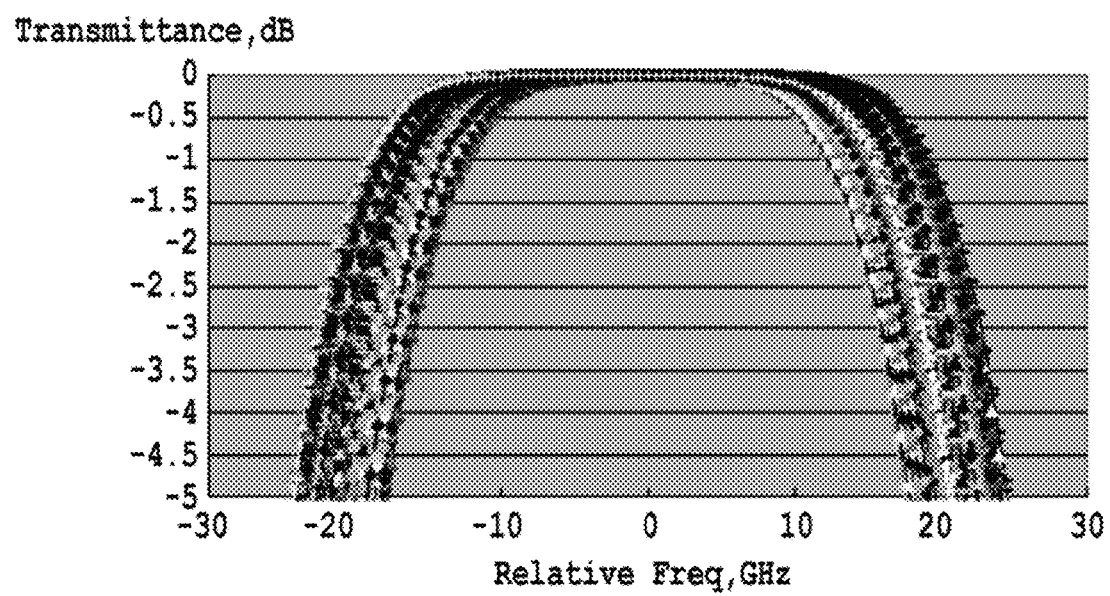
FIG. 4 is a diagram showing transmission spectrum characteristics of each channel implemented by an optical switch according to one embodiment.

FIG. 4 is a graph of overlaying transmission spectrum characteristics of each channel implemented by the present parameters. Using the LCOS element enables the setting of an arbitrary wavelength spacing, but here, WDM optical signals with 50-GHz spacing on 88ch are assumed. In the example shown in PTL 1, the transmission of only a specific wavelength is possible. However, it can be seen to achieve a 0.5-dB bandwidth of 20 GHz or higher for all signals on 88ch in the optical switch of the present embodiment.

Embodiment 2

About the optical switch described in the embodiment 1, the setting of the switch axis direction will be described with a numerical example in the present embodiment 2. The configuration of the optical system is the same as in the embodiment 1, and only the featured parts in the present embodiment will be described.

As shown in FIG. 3, the switch axis direction is oriented along the long side of the LCOS. At this time, it is necessary to equally distribute each of the optical signals at 5 inputs onto the input-side LCOS (optical deflection element 5) and each of the optical signals at 5 outputs onto the output-side LCOS (optical deflection element 8). When 1024 pixels are equally divided by 5 input/output beams, 205 pixels (width is wch=205×11 μm=2253 μm) are occupied per input/output beam. Each pixel is a fine phase modulation element, and a plurality of pixels collectively form a spatial phase modulation element.

Figure 5:
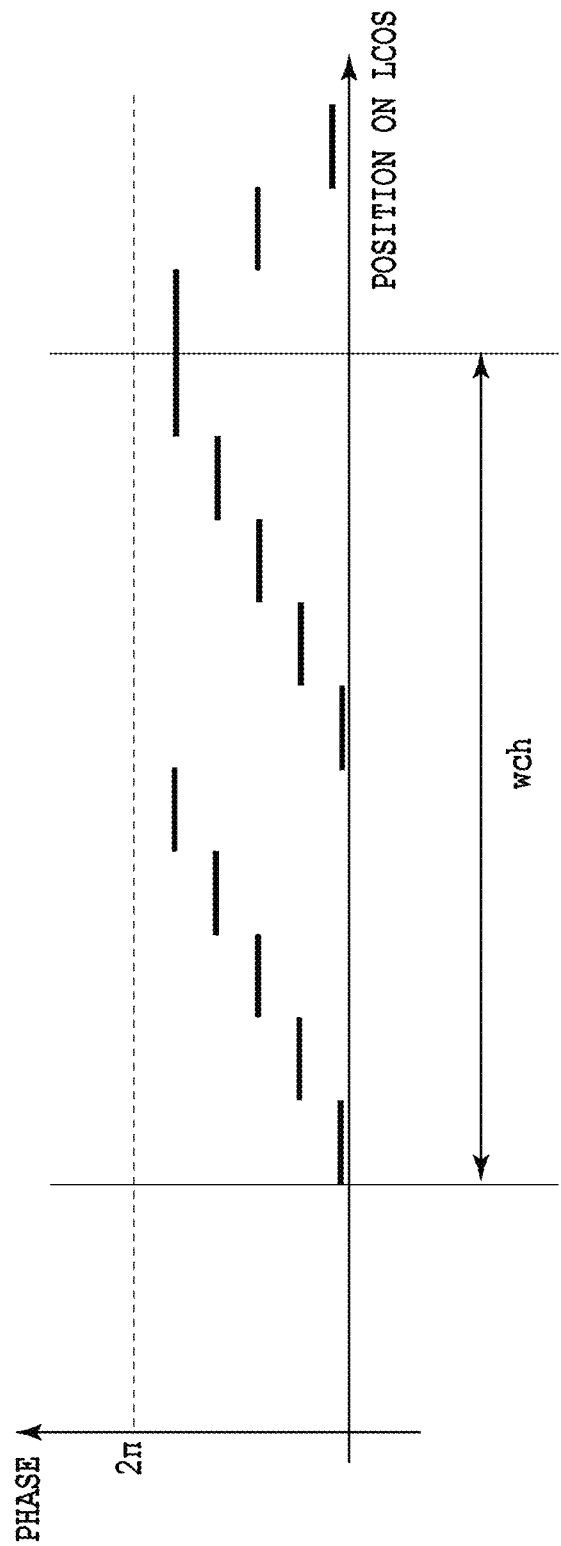
FIG. 5 is a diagram illustrating phase distribution set on LCOS when the LCOS is used as an optical deflection element.

Deflection of the optical signal using the LCOS is made in the method shown in FIG. 5. Specifically, by use of each pixel on the LCOS, a spatial waveform having phase distribution in serrodyne wave form is placed to tilt the wavefront of the input light. The serrodyne waveform is implemented by equivalently generating a stepwise waveform from a sawtooth wave ranging in phase from zero to $2\pi$, so that the incident optical signal allows the reflection direction to change in accordance with slope of the serrodyne. The phase distribution in FIG. 5 is set in the switch axis direction in the region on the LCOS corresponding to each input/output port shown in FIG. 3. The slope of the serrodyne waveform in the optical deflection element 5 is only required to be determined such that the incident optical signal moves toward a position on the optical deflection element 8 corresponding to desired output. The slope of the serrodyne waveform on the optical deflection element 8 is only required to be determined such that the optical signal incident on the optical deflection element 8 is redirected toward the desired output port.

For example, in the foregoing numerical example, for outputting from the input port 1 to the output port 3, a position shift of the principal ray of the beam in the switch axis direction is 2253×(3−1)=4506 μm. Since the distance between the optical deflectors 5 and 8 is 143 mm×4=572 mm, a deflection angle required for switching is a tan(4.506/572) =0.45 degrees. Accordingly, for example, for switching a 1.55-μm optical signal, a cycle period of the serrodyne waveform is only required to be determined to obtain:

$$0.45° = a\tan(1.55/\text{period})$$

$$\text{Period} = 197 \text{ μm}.$$

That is, since the pixel size is 11 μm, it is only required to set a serrodyne waveform with a period for each 197/11=17.9 pixel.

Note that, it is necessary to sufficiently contain Gaussian beam corresponding to the optical signal from each input/output in a region on the LCOS corresponding to each input/output shown in FIG. 3. If it is not sufficiently contained, light leaks into an adjacent port, leading to the degradation in adjacent crosstalk. In this case, as a width sufficiently reducing the outskirts of Gaussian beam, a Gaussian beam width wSW is set as wSW=wch/α=wch/3.5=644 μm. Here, a coefficient α(=3.5) is determined from values of crosstalk between required ports.

Note that, an optical element having power in the switch axis direction (x direction) is not placed between the optical deflection elements 5 and 8. Therefore, for example, if an optical signal having a beam waist propagates on the optical deflection element 5 as it is, the optical signal passing through the optical deflection element 5 propagates while increasing the diameter. For example, as described earlier, when the wSW=644 μm beam has a waist on the optical deflection element 5, the spread of the beam causes the beam to spread out to 774 μm on the optical deflection element 8. This will generate port-to-port crosstalk on the optical deflection element 8, which is not desired.

Figure 6:
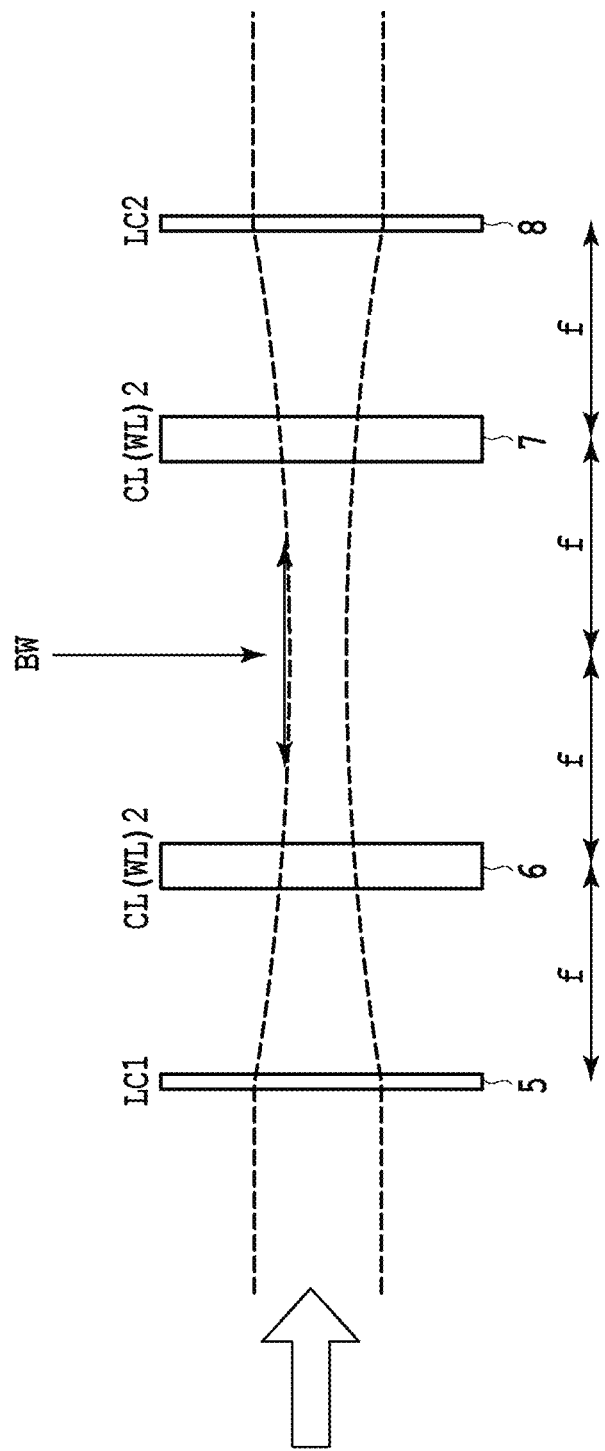
FIG. 6 is a diagram illustrating a set position of a beam waist.

In the present invention, the foregoing problem is solved by setting a beam waist in the BW position shown in FIG. 6. FIG. 6 is a selected part of the optical system between the optical deflection elements 5 and 8. The dotted line shows the shape of the beam propagating from the input 3 to the output 3. As shown in FIG. 6, the distance between the optical deflection elements 5 and 8 is set to four times the focal length of the cylindrical lens 4, 6, 7, and 9. This is uniquely determined from the conditions of the wavelength axis. Therefore, in the present numerical example, the distance between BW and the optical deflection elements 5 and 8 is 143×2=286 mm. In this case, if the position of the beam waist is set to BW and the size is determined as wBW=598 μm, this allows a wSW=644 μm beam to be obtained on the optical deflection elements 5 and 8.

Figure 7:
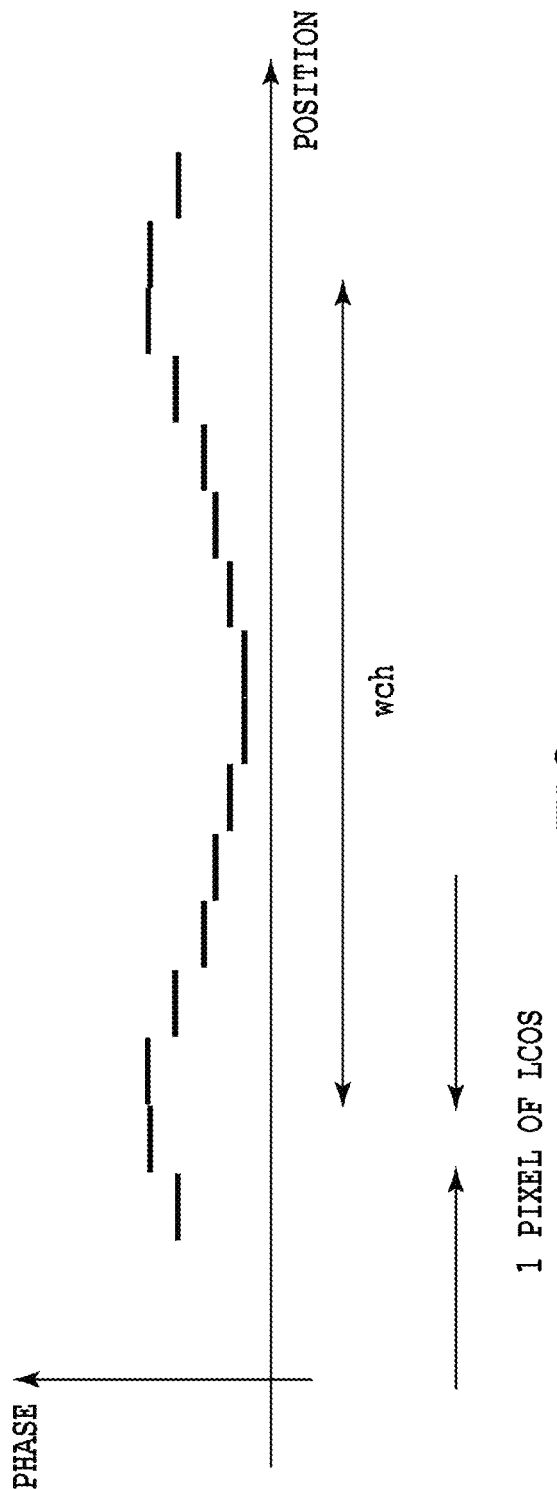
FIG. 7 is a diagram illustrating phase distribution set on LCOS when the LCOS is used as an optical deflection element.

In particular, in the case of employing LCOS as an optical deflection element, the phase of the pixels included in wch in the switch axis direction should form a curved surface as shown in FIG. 7. In FIG. 7, the horizontal axis represents the position in the switch axis direction on the LCOS, while the vertical axis represents the phase set for each pixel. In the case of the entry of an optical signal with a beam waist formed on the optical deflection element 5, if phase distribution corresponding to a concave surface with a curvature radius of 143 mm is set on the LCOS, a new beam waist can be formed in the position of the center BW between the optical deflection elements 5 and 8. The phase distribution of the curved surface shown in FIG. 7 is set to be overlaid on the serrodyne waveform shown in FIG. 5, thereby enabling the setting of the beam waist to the BW position while maintaining the switching function. This overlaying may be implemented by $\Phi = \alpha x^2 + \beta x$ where $\beta$ is the slope of the serrodyne waveform shown in FIG. 5 and $\alpha$ is a coefficient of quadratic of a quadratic curve with which the curved surface shown in FIG. 7 is approximated. The x is a position in the switch axis direction on the LCOS.

The present embodiment has described the example of setting the position of exactly midpoint BW beam waist between the optical deflection elements 5 and 8. However, it is clear that this position is not limited, provided that the beam diameter in the switch axis direction on the optical deflection elements 5 and 8 can be set as small as to be able to reduce the port-to-port crosstalk.

Even in the case of employing an optical deflection element such as MEMS mirror array or the like, it is clear that a curvature in the switch axis direction should be given to each of the mirrors such that the beam waist is located between the optical deflection elements 5 and 8.

It is assumed in the present embodiment that the beam waist exists on the optical deflection elements 5 and 8 as well. However, if the width of wSW satisfies the required port-to-port crosstalk, the beam waist may not be necessary to be on the optical deflection elements 5 and 8.

In the optical switch having a plurality of input ports or output ports, the amount of deflection caused by the optical deflection element may increase to possibly make it difficult to form the LCOS having the number of pixels required for switching on a single substrate. In such a case, the optical deflection element can be implemented by use of a plurality of LCOSs lined up. Likewise, regarding to the lens 1, 4, 6, 7, 9, 11, 13, and 14, a plurality of the lenses of the same kind can be placed side by side to achieve a single optical element.

Embodiment 3

Figure 8:
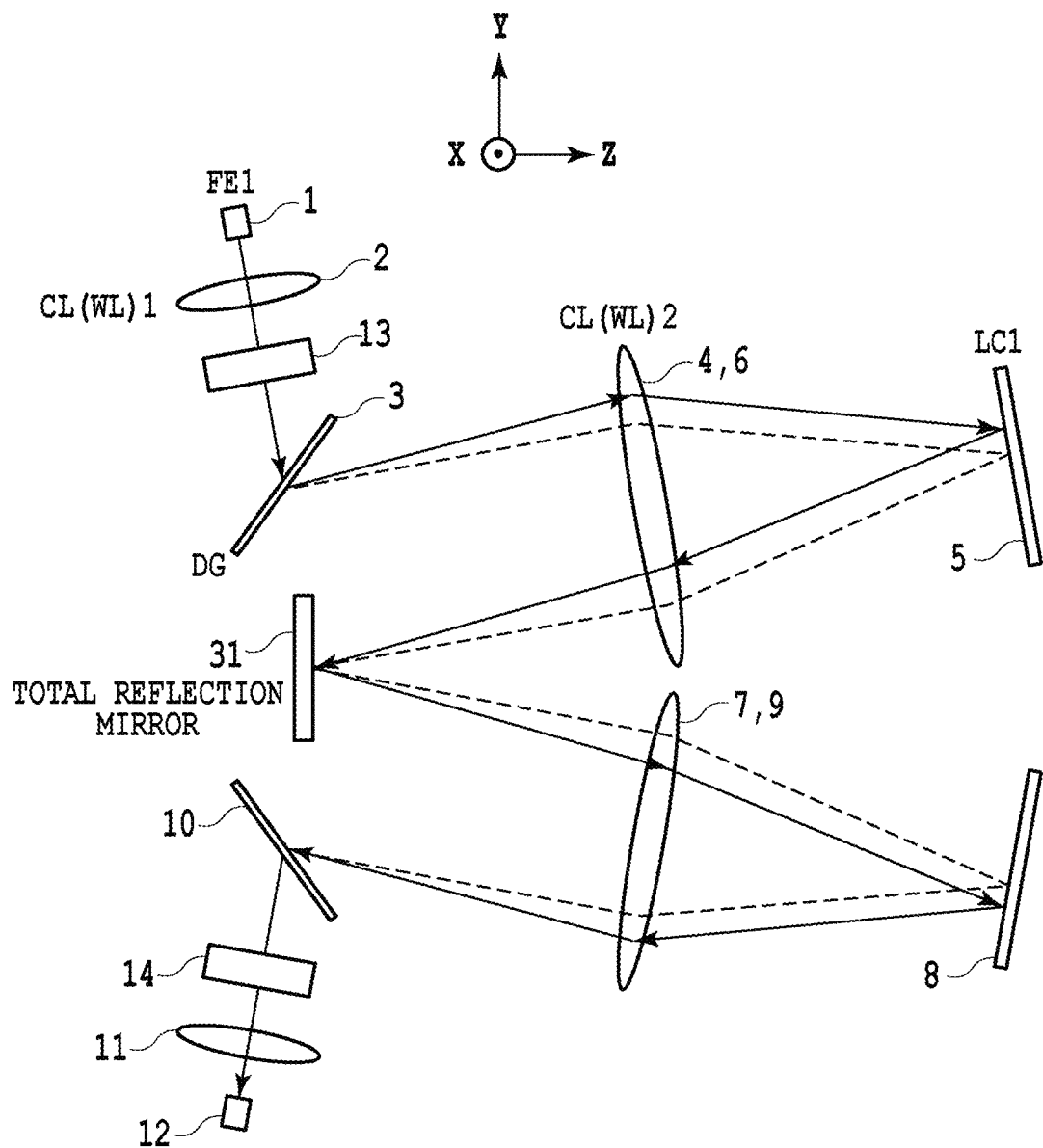
FIG. 8 is a diagram illustrating the configuration of an optical switch according to one embodiment.

The present embodiment 3 will use FIG. 8 to describe the actual configuration of the optical system shown in the embodiments 1 and 2. In FIG. 8, an optical signal incident from the front-end optical element 1 enters the transmission type diffractive optical element 3 through the collimator lens 2 having power (refractive force) in the wavelength axis direction (z direction) and the collimator lens 13 having power (refractive force) in the switch axis direction (x direction). The optical signal that is output from the diffractive optical element 3 in different directions from wavelength to wavelength enters the optical deflection element 5 through the condenser lens 4 having power in the wavelength axis direction (y direction). The optical signal incident to the optical deflection element 5 is deflected on the basis of the principle described in the embodiment 2 and then propagates toward a region on the optical deflection element 8 corresponding to the desired output. The optical signal reflected by the optical deflection element 5 is converted into parallel light in the wavelength axis direction (y direction) by the collimator lens 6 having power in the wavelength axis direction (y direction), in which the optical signal is made to pass through a different portion of the foregoing condenser lens 4, so that the two are capable of being shared, leading to a reduction in the number of components. The condenser, collimator lenses 4 and 6 are placed in a position where the distance from the diffractive optical element 3 and the optical deflection element 5 is equal to the focal length. Such an arrangement enables the setting of a position of beam waist onto the optical deflection element 5 in the wavelength axis direction (y direction) and the maintenance of the telecentric conditions. Since the position of the beam waist is set on the optical deflection element 5, the switching having high wavelength selectivity is made possible.

Then, the optical signal passing through the collimator lens 6 is reflected by a total reflection mirror 31 to propagate toward the optical deflection element 8 via the condenser lens 7 having power in the wavelength axis direction (y direction). In the optical deflection element 8, the optical signal is deflected on the basis of the principle described in the embodiment 2 to be reflected in the direction of the desired output. The optical signal reflected by the optical deflection element 8 is converted into parallel light by the collimator lens 9 having power in the wavelength axis direction (y direction), in which, as in the case of each of the condenser, collimator lenses 4 and 6, the optical signal is made to pass through a part of the condenser lens 7, so that sharing of the two is able to be achieved. The condenser, collimator lenses 7 and 9 each are placed in a position where the distance from the optical deflection element 8 and the diffractive optical element 10 described later is equal to the focal length.

In addition, the total reflection mirror 31 is also placed in a position where the distance from each of the condenser collimator lenses 4 and 6 and each of the condenser collimator lenses 7 and 9 is equal to each focal length of them.

Finally, the optical signal is wavelength-multiplexed by the diffractive optical element 10 and then passes through the condenser lens having power in the switch axis direction (x direction) and the condenser lens having power in the wavelength axis direction, to be coupled to the front-end optical system 12.

Employing the total reflection mirror 31 as in the present embodiment enables the folding arrangement of the overall optical system, making it possible to realize a reduction in size of the apparatus.

Embodiment 4

Figure 9A:
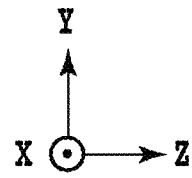
FIG. 9A is a diagram illustrating the configuration of an optical switch according to one embodiment.
Figure 9A:
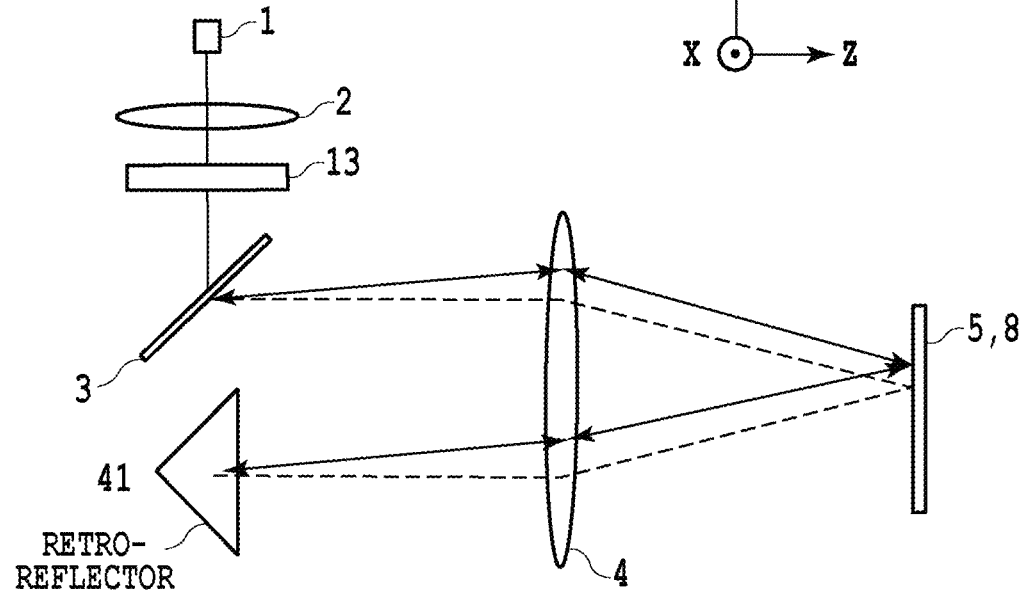
Figure 9B:
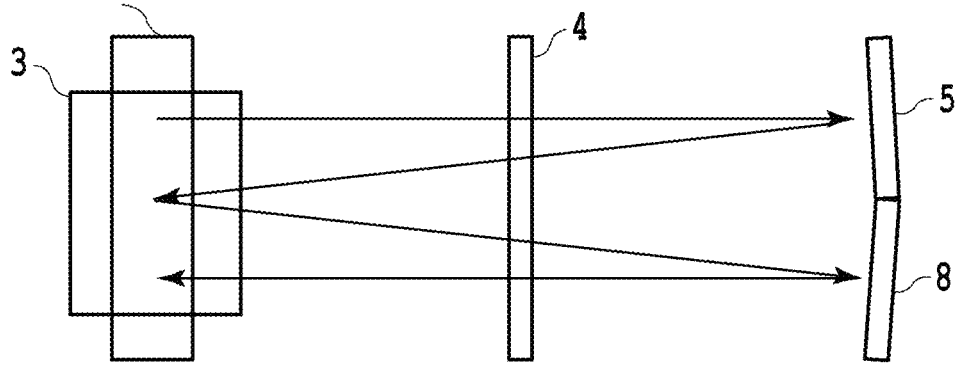
FIG. 9B is a diagram illustrating the switch axis in the optical switch in FIG. 9A.
Figure 9B:
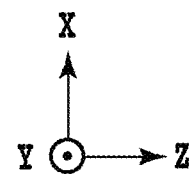

The present embodiment 4 shows further miniaturization of the optical system shown in the embodiment 3. FIGS. 9A and 9B are diagrams illustrating the present embodiment 4.

In FIG. 9A, an optical signal that is output from the front-end optical element 1 is converted into parallel light through the collimator lens having power in the wavelength axis direction (z direction) and the collimator lens 13 having power in the switch axis direction (x direction), and then is wavelength-demultiplexed by the diffractive optical element 3 (y direction). As described in the embodiment 3, the wavelength demultiplexed signal is concentrated onto the optical deflection element 5 to be deflected, in which the condenser collimator lens 4 related to input/output to the optical deflection element 5 is shared as a single lens.

The optical signal passing through the condenser collimator lens 4 is reflected by a retro-reflector 41. The retro-reflector 41 reflects off the incident light in exactly the same direction as that at the incident angle to inverse an image. The optical signal reflected by the retro-reflector 41 enters the optical deflection element 8 through the condenser collimator lens 4 again.

Here, as shown in the explanatory diagram relating to the switch axis in FIG. 9B, the optical deflection element 5 is preferably placed to tilt to an angle in the switch axis direction (x direction). The same is true for the optical deflection element 8. Such placement enables the sharing of the condenser collimator lens 4 between inputting and outputting to and from the optical deflection elements 5 and 8, making it possible to realize a reduction in the number of components and miniaturization of the apparatus.

The explanatory diagram showing the switch axis in FIG. 9B shows only the optical system from the diffractive optical element 3 to the retro-reflector 41.

PTL 1 shown in the related art shows a similar configuration, but essential differences in the following two respects will be clearly demonstrated.

Figure 10A:
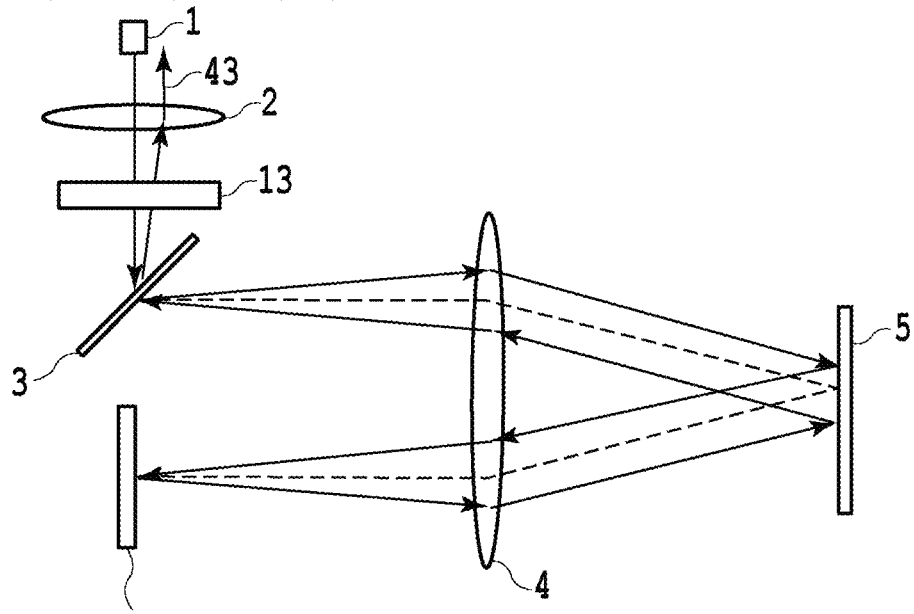
FIG. 10A is a diagram illustrating an optical system of a related-art wavelength selective switch using a total reflection mirror.
Figure 10B:
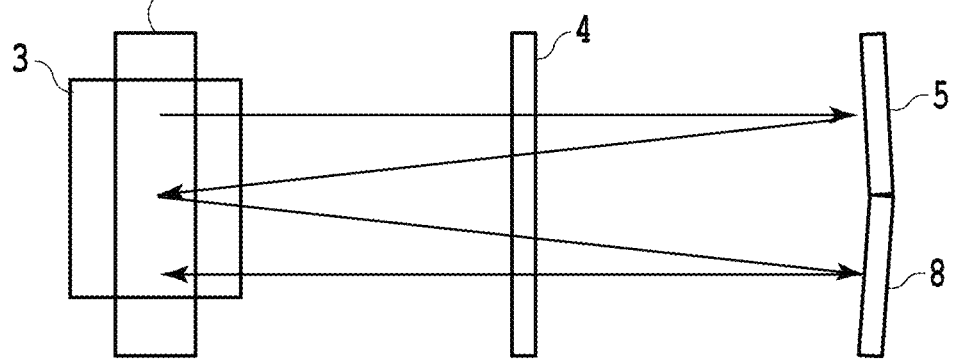
FIG. 10B is a diagram illustrating the switch axis in the wavelength selective switch in FIG. 10A.

First, in the optical system described in PTL 1 (for example, FIG. 4-1 in PTL 1), the method of placing the total reflection mirror 42 (402 in FIG. 4-1 of PTL 1) instead of the retro-reflector 41 is disclosed as shown in FIGS. 10A and 10B. In this optical system, an optical signal other than a center wavelength (indicated with a dotted line) propagates into, e.g., an optical path 43 when returning to the front-end optical system on the output side. In this case, the center wavelength refers to an optical signal of a wavelength normally incident on the total reflection mirror 42. Accordingly, although the optical signal of the center wavelength is coupled to output, the optical signal of other wavelengths appears as a loss.

Secondly, in the optical system shown in PTL 1, as shown in FIG. 4-2 of PTL 1, the inputting to a total reflection mirror 402 via a lens 401 having power also in the switch axis direction is disclosed. However, the switching operation is hampered in this optical system as described below. The optical signal deflected by the MEMS mirror is converted to a position on the total reflection mirror 402 by the lens 401 in accordance with the deflected angle, but an angle of entry into the total reflection mirror is uniquely determined depending on the position of the MEMS mirror 107. An angle of reflection from the total reflection mirror 402 is determined depending on the angle of entry into the mirror, but it is also uniquely determined depending on the position of the MEMS mirror 107 on the input side. The optical signal reflected by the total reflection mirror 402 is incident on the MEMS mirror 106b on the output side by the lens 401, in which the incident position is determined by the angle of reflection on the total reflection mirror 402. Since, as described above, the angle of reflection from the total reflection mirror 402 is uniquely determined by the position of the MEMS mirror 107 on the incident side, the position of the incident-side mirror 107 and the position of the output-side mirror have a one-to-one relationship at all times.

Accordingly, the relationship between the input and output ports is one to one at all times regardless of the angle of the MEMS mirror, so that the switching operation is not implemented.

On the other hand, the optical system in the optical switch according to the present embodiment 4 employs the retro-reflector 41 as a reflector optical element, and also the cylindrical lens having power only in the wavelength axis direction, leading to the solution of the aforementioned first problem arising in the method disclosed in PTL 1.

In the optical system in the optical switch according to the present embodiment 4, the optical system between the two optical deflection elements is configured, in regard to beam shaping, as a 2f system in the switch axis direction for beam shaping by using the phase modulation effects of the LCOS to form a concave mirror, and in regard to beam deflection, as an optical system for only the deflection function of the optical deflection element. Accordingly, the solution of the aforementioned second problem arising in the method disclosed in PTL 1 is possible.

Embodiment 5

Figure 11A:
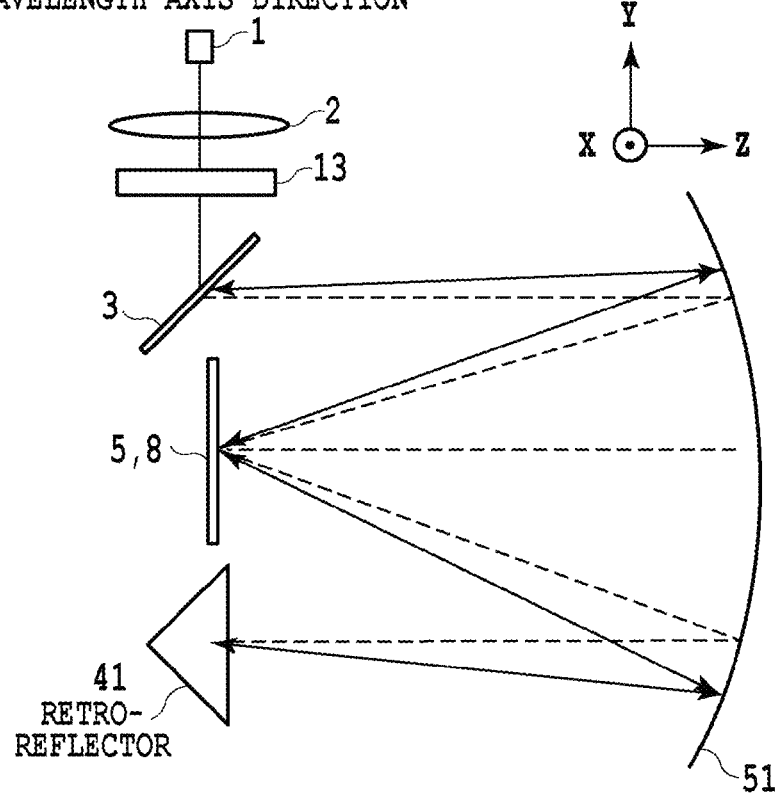
FIG. 11A is a diagram illustrating the configuration of an optical switch according to one embodiment.
Figure 11B:
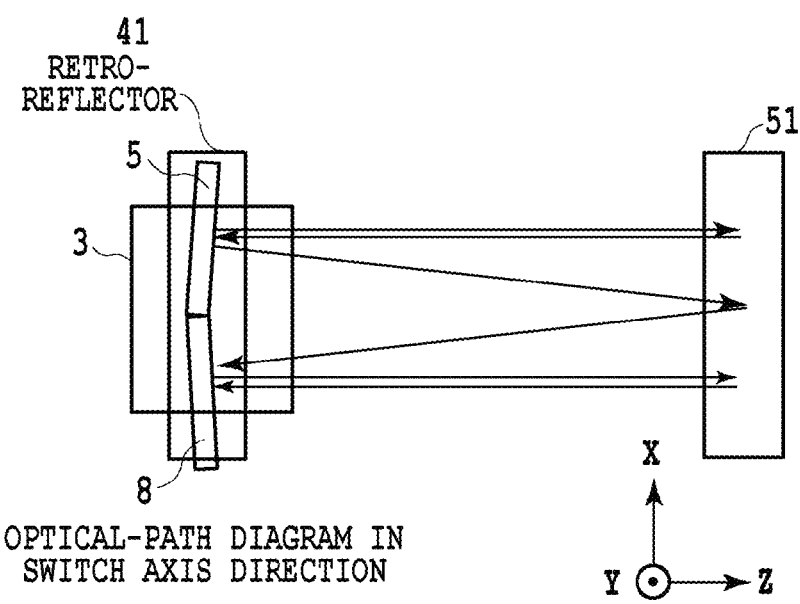
FIG. 11B is a diagram illustrating a switch axis in an optical switch according to one embodiment.

The present embodiment 5 shows a configuration for further reduction in size of the optical system shown in the embodiment 4. FIG. 11A and FIG. 11B are diagrams illustrating the present embodiment 5.

As compared with the optical switch in FIGS. 9A and 9B, the optical switch shown in FIGS. 11A and 11B differs in that the condenser collimator lens 4 is replaced with a concave mirror 51 having power only in the wavelength axis direction (y direction). In the optical system in FIGS. 9A and 9B, the diffraction grating 3 and the optical deflection elements 5 and 8 are placed at a distance of the focus distance f of the condenser collimator lens 4 on both sides of the condenser collimator lens 4, so that the width of 2f is required. On the other hand, the configuration in FIGS. 11A and 11B only requires mere f as a sufficient width, contributing to miniaturization of the apparatus.

Embodiment 6

The present embodiment 6 will describe the front-end optical element.

The front-end optical systems 1 and 12 can be accomplished by use of silica-based optical waveguide (hereinafter, PLC: Planar Lightwave Circuit).

As shown in the embodiments 1 and 2, the output light from the front-end optical system 1 is output at different angles corresponding to the input ports as the optical switch. The present embodiment 6 shows a method of employing a silica-based planar lightwave circuit (PLC) to implement the optical system. The present embodiment 6 uses a silica-based waveguide to describe an embodiment according to the present invention, but it is apparent that the similar effects will be produced even in the use of a waveguide such as of Si, SiON, SiN, LiNbO3, PLZT, a compound semiconductor or the like. It is possible to implement a similar optical system by using a bulk optical system using an optical fiber array and a lens without using the waveguide.

Figure 12:
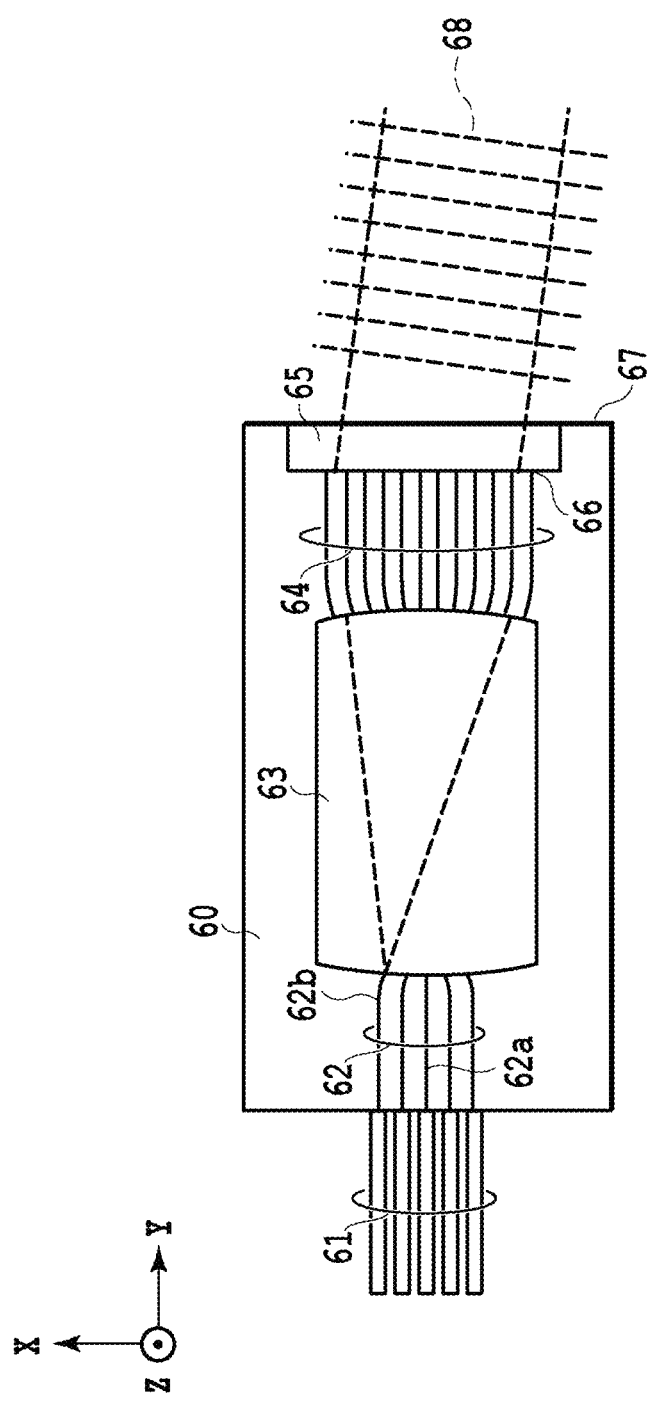
FIG. 12 is a diagram illustrating a front-end optical system using a silica optical waveguide.

FIG. 12 is a schematic diagram of the front-end optical system implemented by use of the silica-based optical waveguide. The front-end optical system is manufactured by a typical method of producing an optical waveguide by flame hydrolysis deposition, reactive ion etching and the like, which operates as follows. Here, a front-end optical system on the incident side (corresponding to the front-end optical system 1 in the embodiment 1) is representatively described. By reversing the traveling direction of the lightwave, the operation as a front-end optical system on the output side (corresponding to the front-end optical system 12 in the embodiment 1) is possible. That is, at least one in an input optical fiber group 1 corresponds to an input port or an output port.

An optical signal that is input from an input optical fiber group 61 enters into a slab waveguide 63 via an input waveguide 62 formed on a silica-based optical waveguide 60. The optical signal propagating through the slab waveguide 63 enters into an output slab waveguide 65 via array waveguides 64, and then is output into free space from an end face 67 of the silica-based optical waveguide 60.

In the slab waveguide 63, in a horizontal direction of substrate, the beam diameter W of the optical signal is expressed in accordance with the propagation distance z by:

Equation 1

$$W = w\sqrt{1 + \left(\frac{\lambda x}{\pi n_s w^2}\right)^2}, \tag{1}$$

where w is a mode diameter of a fundamental mode of the input waveguide 62, λ is a wavelength of the optical signal, $n_s$ is a refractive index of the slab waveguide. Therefore, the spatial intensity distribution in the array waveguides 64 is made according to equation (1). If the optical waveguides making up the array waveguides 64 each are determined to be equal in length, it is possible to hold the phase distribution in the slab waveguide 63 and the array waveguides 64 on the array-waveguide output interface 66.

By such setting, the light that is output from the silica-based optical waveguide 60 may result in an optical signal group of Gaussian beams differing in output angles corresponding to the input ports. For example, an optical signal that is input from an input port 62b enters the slab waveguide 63 from a position deviating from the center (a position to which the optical signal that is input from an input port 62a is incident). As a result, the optical signal enters the array waveguide 64 so as to have a constant phase difference in each array waveguide. That is, this corresponds to wavefront tilt on the array-waveguide output interface 66, resulting in inclination of the direction of the wavefront, that is, the outgoing direction, of the output light depending on an input port as shown on the wavefront 68.

In the optical system shown in the embodiment 1, the substrate direction (x direction) of the silica-based optical waveguide 60 in FIG. 12 is set to the switch axis direction, and the vertical direction (z direction) is set to the wavelength axis direction.

The operation of the front-end optical system using the waveguide is as described above, and the following advantages are present in the optical system.

(1) Since the positioning of the optical path can be effected by photolithography, the alignment operation is not necessary, thus implementing an optical system that is robust to environmental changes.

(2) A beam-waist size in the substrate horizontal direction can be set arbitrarily.

(3) A beam-waist position can be arbitrarily set in the substrate vertical direction and the substrate horizontal direction. (which will be described later)

For configuring the front end in a usual optical system, active alignment of the fiber array and a plurality of lenses is required, leading to an increase in manufacturing costs. However, using a waveguide to implement a front-end optical system as in the present embodiment makes it possible to use a semiconductor process suited to mass production, thus improving the manufacturing throughput.

As shown in Equation (1), in the front-end optical system according to the present embodiment 6, the length z of the slab waveguide 63 is appropriately changed in order to achieve a beam diameter of an arbitrary size with ease. This feature effectively acts in the use of LCOS as an optical deflection element. This is because, in the optical deflection element based on the diffractive optical effects such as LCOS, it is difficult to provide a large deflection angle. Therefore, the beam diameter in the switch axis direction is required to be set to be large in order to ensure the port-to-port crosstalk. This may translate to a reduction in NA of the beam on the LCOS. On the other hand, it is desirable that the beam diameter in the wavelength axis direction is smaller, making the beam very flat on the LCOS. Specifically, by use of the optical waveguide in the front-end optical system, the beam diameter depending on the fundamental mode of the waveguide is formed in the wavelength axis direction (substrate vertical direction, z direction), whereas an arbitrary beam diameter can be achieved by adjusting "z" of equation (1) in the switch axis direction (x direction), facilitating formation of such a flat beam. For example, in the silica-based optical waveguide having a relative refractive index difference of 0.75%, the beam diameter in the substrate vertical direction is constant in the order of 4 μm, but a 1.6-mm beam can be achieved in the substrate horizontal direction by setting "z" to 20 mm. An aspect ratio at the output end of the beam reaches 1:400. It is difficult to achieve such a flat bean by using a usual bulk optical element.

In addition, a change in length of the output slab waveguide 65 as appropriate makes it possible to arbitrarily set a position of the beam waist in the vertical direction and the horizontal direction of the substrate. This is because the beam waist in the substrate vertical direction exists at the output end 67 of the silica-based optical waveguide 60, and the beam waist in the substrate horizontal direction exists at the output end 66 of the array waveguides.

The capability of arbitrarily setting a position of the beam waist immediately after being output from the front-end optical element in the vertical and horizontal directions of the substrate makes it possible to increase the degree of freedom in the design of the spatial optical system (at stages downstream from the lens 2 in the embodiment 1). The advantages will be described below.

Preferable points described in the examples shown in the embodiments 1 and 2 are:

the beam waist is set in the BW position in FIG. 6; and the beam waist is on each of the diffractive optical elements 3 and 10. The second point is equivalent to the entry as parallel light into the diffractive optical element.

Figure 13:
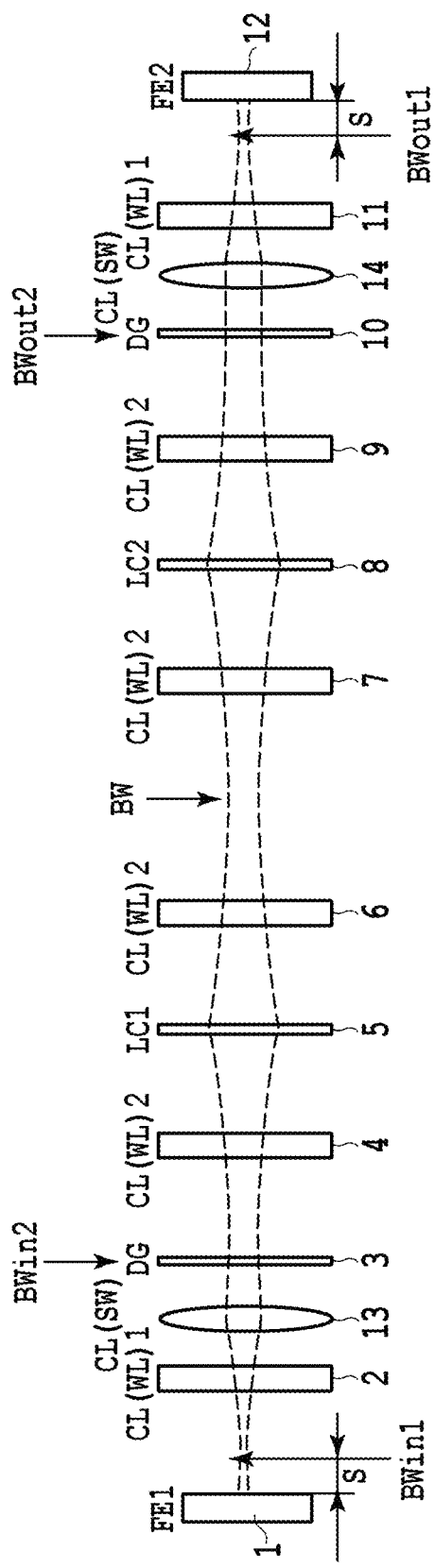
FIG. 13 is a diagram showing the positional relationship of a beam waist in a switch axis direction in an optical switch according to one embodiment.

The optical system may be configured into such conditions as follows. Specifically, the beam shape at the output end of the front-end optical element 1 may be advisably set such that:

in the switch axis direction, the beam waist has a size of 42 μm in a position at a 13.7-mm distance from the optical waveguide output end 67; and in the wavelength axis direction, the beam waist has a size of 4 μm in a position of the optical waveguide output end 67. The beam waist in the switch axis direction is required to be optimized every time a parameter of the optical system, such as a focal distance of a lens, changes. When this condition is set, the beam waist in the switch axis direction can be set in a position of the diffractive optical element. FIG. 13 shows a positional relationship of beam waists in the switch axis direction. In FIG. 13, beam waists having a beam size of 42 μm exist in positions BWin1 and BWout1 at a distance s from the front-end optical elements 1 and 12 in which s=13.7 mm, while beam waists having a beam size of 598 μm exist in positions BWin2 and BWout2 of the diffractive optical elements 3 and 10 and a midpoint position BW between the optical deflection elements 5 and 8.

In this manner, a difference in requirement pertaining to a beam between the wavelength axis and the switch axis arises from the necessity to consider a beam on the LCOS in the switch axis direction as in Fresnel region because it has a relatively large size, although a beam on the LCOS in the wavelength axis direction can be approximated as a diffraction phenomenon of Fraunhofer region because it has a small size. The beam diameter in the switch axis direction is required to be large on the LCOS. This is because the LCOS cannot cause a large beam deflection angle, so that NA of the beam on the LCOS is required to be small in order to ensure port-to-port crosstalk.

In the examples up to this point, the LCOS having the number of ports of 5 inputs and 5 outputs, a pixel size of 11 μm and the number of pixels of 1024×768 has been described as an example. In the example, the beam size on the LCOS is 644

μm. However, in different parameters, requirements regarding the positions of the BWin1 and BWin2 differ. In some cases, it may be appropriate that the BWin1 and BWin2 exist within the optical waveguide. In the front-end optical element shown in FIG. 12, since the BWin1 and BWin2 exist at the array output end 66, it is suitable to meet such requirements.

Figure 14:
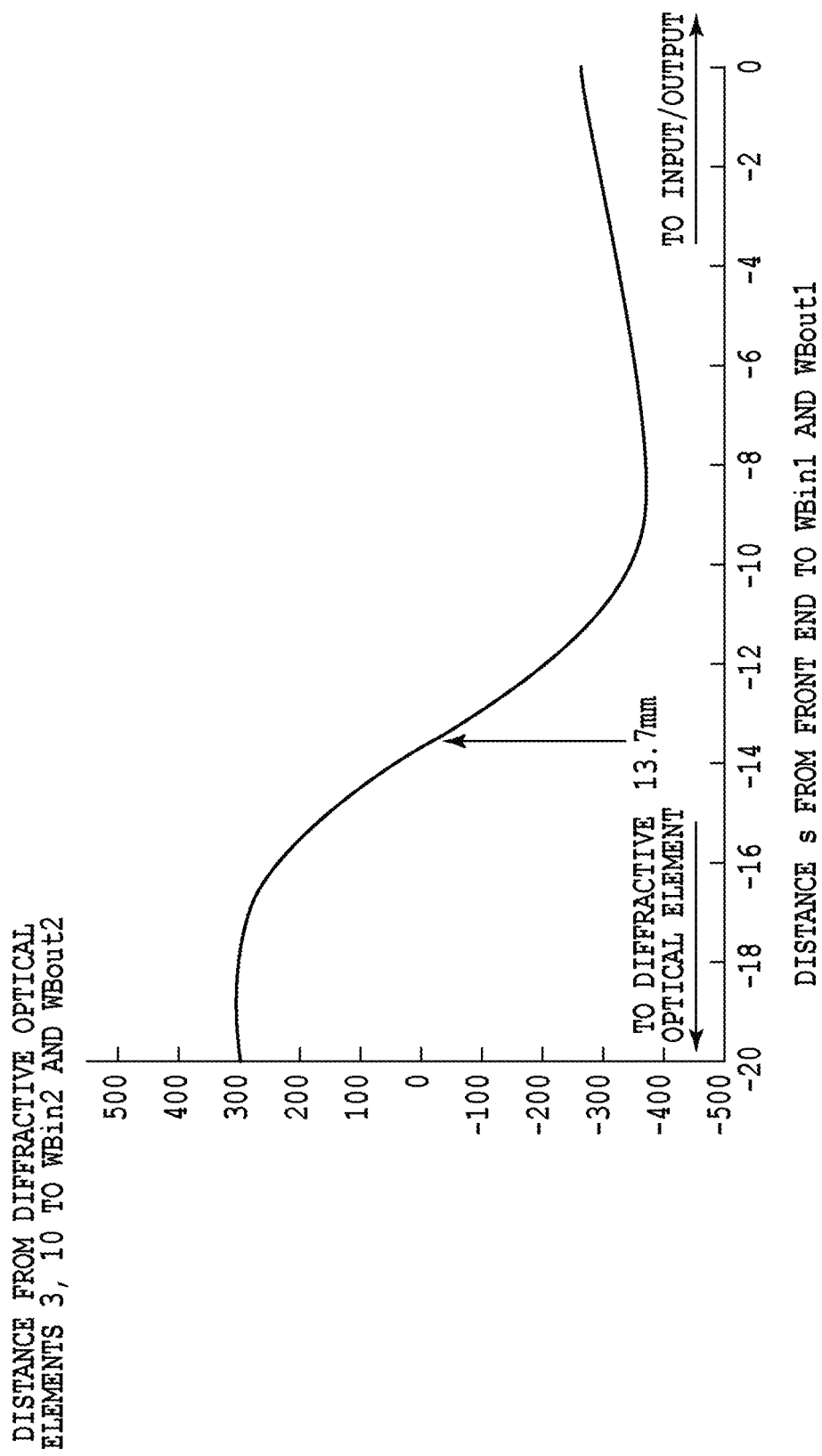
FIG. 14 is a graph showing the relationship between a distance s from a front-end optical element to a beam waist and a distance from a diffractive optical element to the beam waist.

FIG. 14 is the plot of the relationship between the distance s from the front-end optical elements 1 and 2 to the beam waists BWin1 and BWout1, and the distance between the diffractive optical elements 3 and 10, and the BWin2 and BWout2. As described earlier, the BWin2 and BWout2 should be set on the diffraction grating, in which they are preferably set to zero on the vertical axis of the plot. However, as shown in FIG. 14, the distance between the diffractive optical elements 3 and 10, and the BWin2 and BWout2 varies greatly even if the distance changes slightly. Since the front-end optical system using the optical waveguide allows the waist positions BWin1 and BWout1 to be set with accuracy by photolithography, it is suitable for an optical system with exacting tolerances.

Embodiment 7

The present embodiment 7 will describe an implementation example of a front-end optical element achieved by an optical waveguide suitable for forming beam waists in the positions BWin1 and BWin2 shown in the embodiment 6.

Figure 15:
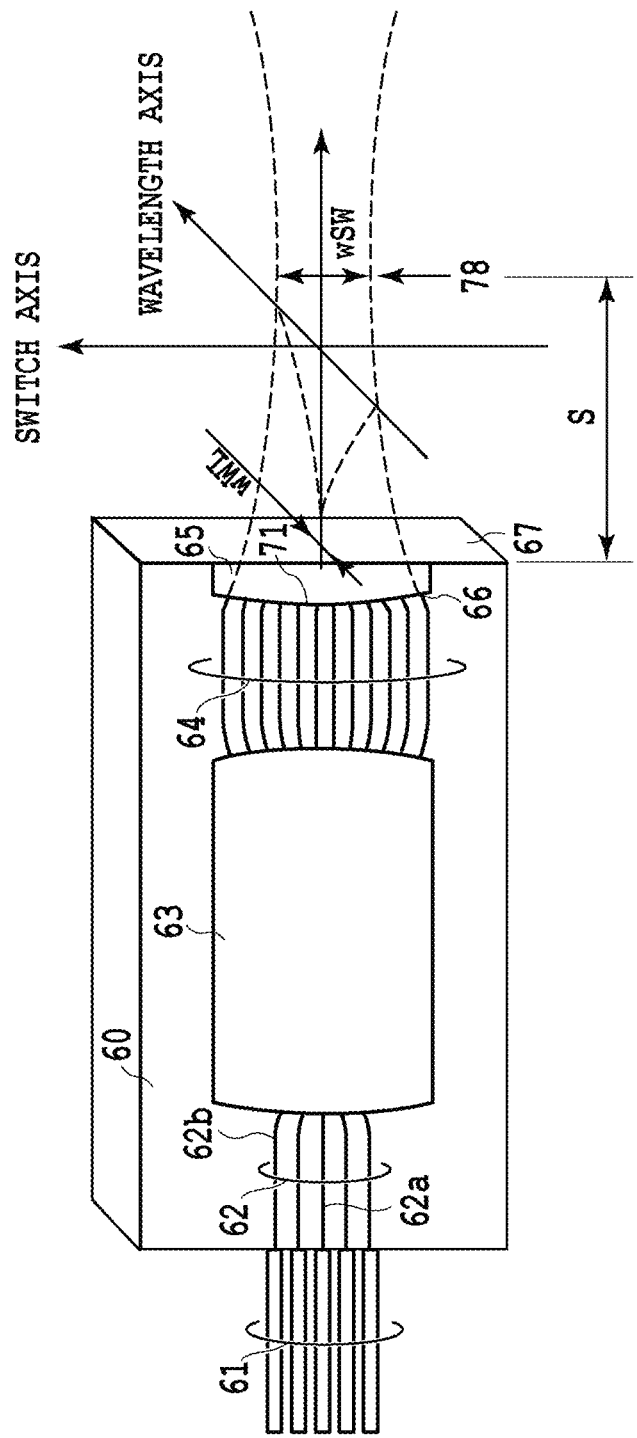
FIG. 15 is a diagram illustrating a front-end optical element in an optical switch according to one embodiment.

FIG. 15 is a schematic diagram of the front-end optical element according to the present embodiment 7. The parts described in the embodiment 6 are omitted in the present embodiment 7. In FIG. 15, the boundary between the array waveguides 64 and the output slab waveguide 65 is formed in a shape of an arc 71. The arc 71 is a convex shape toward the input waveguide 62. At this stage, each of the array waveguides 66 vertically intersects the convex arc 71. All the array waveguides 64 are identical in length with each other, which is the same as in the embodiment 6.

In this case, the output light from the front-end optical system 60 is set as convergent light in the switch axis direction, and the beam-waist position is set at a position 78 at an s distance from an end face 67 of the front-end optical element 60.

In the aforementioned numerical example, preferably, the beam diameter in the switch axis direction in the beam-waist position 78 is wSW=42 μm. The setting is s=13.7 mm. Such a beam is realized by determining the beam diameter at the array waveguide output end 66 to be 166 μm and the curvature of the arc 71 to be 13.7 mm. At this time, if the array waveguides 64 are set to have an equal pitch on either of the boundaries with the input slab 63 and the output slab 65, the length of the input slab waveguide may be 1970 μm. FIG. 15 also shows a beam waist size wWL in the vertical direction (wavelength axis direction) at the end face 67 depending on the thickness of the waveguide of the front-end optical system 60.

Embodiment 8

Figure 16:
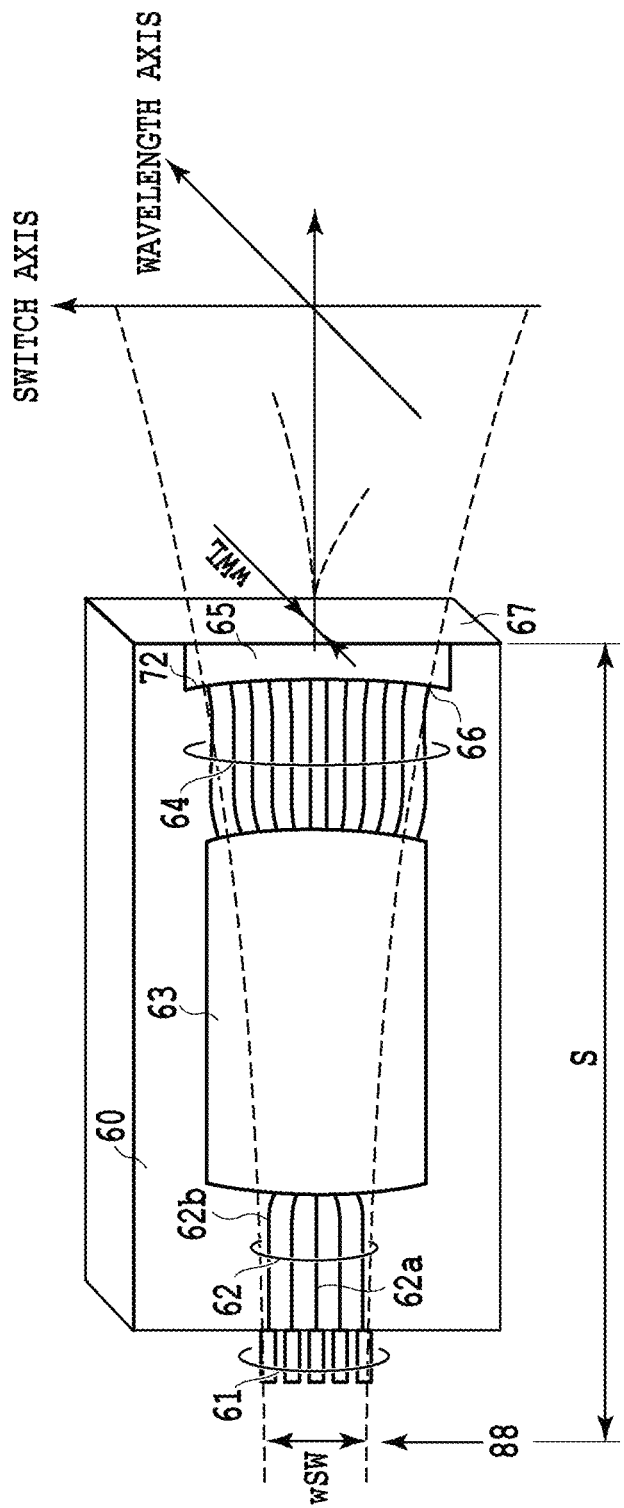
FIG. 16 is a diagram illustrating a front-end optical element in an optical switch according to one embodiment.

The embodiment 7 has described the case where the beam waist is located downstream of the front-end optical system (in the propagation direction of the optical signal). In the present embodiment 8, an example of setting a virtual beam waist in a position upstream of the front-end optical system will be described. FIG. 16 is a schematic diagram of the front-end optical element according to the present embodiment 8. The embodiment 6 has described the case of the beam waist existing within the PLC as an example, but, due to a long distance to the beam waist, the distance may possibly be increased to the extent that a usual wafer process cannot be used for manufacturing. In such a case, as shown in FIG. 16, the boundary between the array waveguides 64 and the output slab waveguide 65 may be designed to form an arc 72 of a concave surface toward the input waveguide 62. Here, each of the array waveguides 66 vertically intersects the concave arc 72. FIG. 16 shows an example of realizing a beam waist in a position (position 88) outside of and upstream from the optical waveguide substrate (input side). FIG. 16 also shows a beam waist size wWL in the vertical direction (wavelength axis direction) at the end face 67 depending on the thickness of the waveguide of the front-end optical system 60.

As shown in the embodiments 7 and 8, since the front-end optical system using the waveguide enables the independent design of beam size and curvature at an output end, the feasibility of beams having a beam waist in an arbitrary position and an arbitrary size is facilitated.

Embodiment 9

The present embodiment 9 will describe the optimum relationship between the front-end optical elements 1 and 12.

The optical deflection element using the diffraction effects of the LCOS and/or the like produces high-order light and/or zero-order light resulting from diffraction. In particular, the zero-order light has high intensity in general, leading to degradation in characteristics of the optical switch due to the crosstalk between ports.

Figure 17:
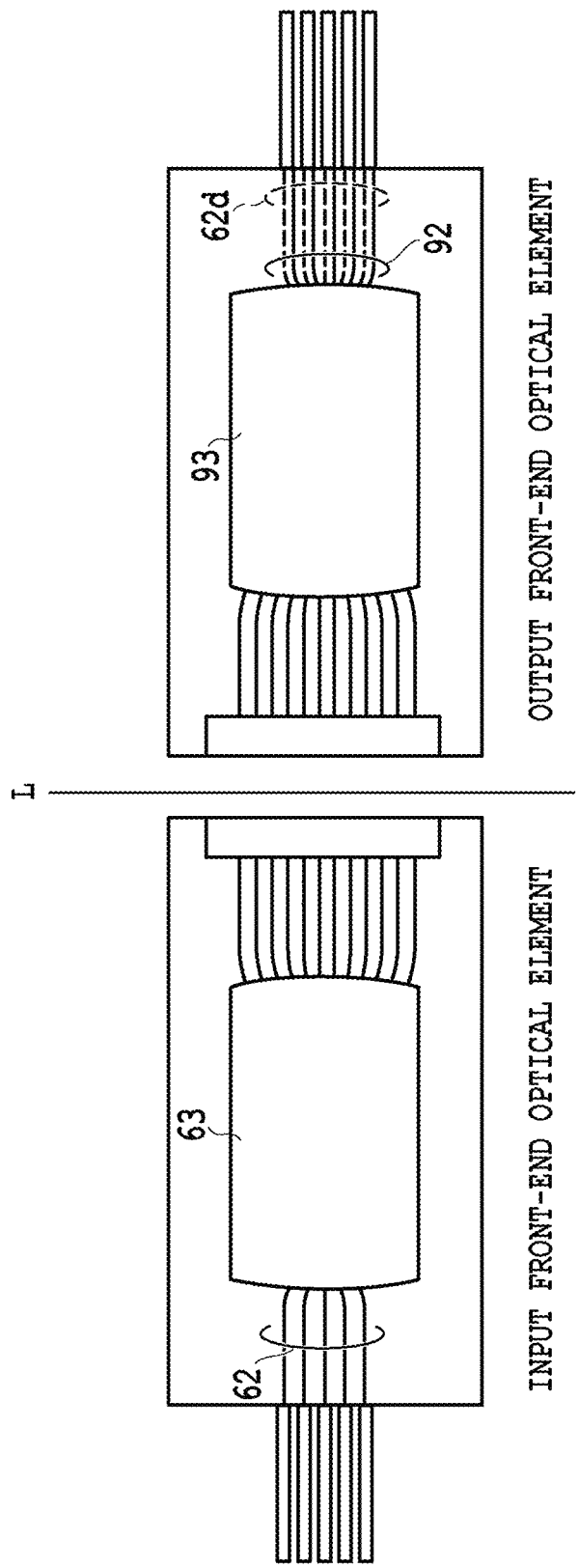
FIG. 17 is a diagram illustrating the relationship between a front-end optical element on input side and a front-end optical element on output side.

FIG. 17 shows the relationship between the input-side front-end optical element and the output-side front-end optical element according to the present embodiment 9. In FIG. 17, the input-side front-end optical element and the output-side front-end optical element are shaped symmetrically with respect to a line segment L, except the positional relationship of connections between connection waveguides 62 and 92 for input and output and slab waveguides 63 and 93. In the output-side front-end, the connection waveguides 92 (indicated with the solid line) are connected to the slab waveguide 93 in positions different from that of connection waveguides 62d (indicated by the dotted line) in the input-side front end. In other words, in the present embodiment, in the output-side front end, the connection waveguide (the solid line) in the output-side front end is connected to the slab waveguide in a midpoint position between positions of the connection waveguides 62d (dotted line) in the input-side front end connected to the slab waveguide.

Since the zero-order light caused by the optical deflection element using the aforementioned diffraction effects propagates into the connection waveguide positions 62d of the input-side front-end optical element, the occurrence of crosstalk can be suppressed by such a displacing arrangement of the positions of the output-side connection waveguides 93.

In the use of the output-side front-end optical element according to the present embodiment 9, when a path is formed between an input and an output which are assigned to the same numbers, the phase distribution of the serrodyne waveform is set in the LCOS element.

REFERENCE SIGNS LIST

1 Front-end optical element
2, 4, 6, 7, 9, 11, 13, 14 Condenser lens
3, 10 Diffractive optical element
5, 8 Optical deflection element, LCOS, MEMS mirror array
41 Retro-reflector
42 Total reflection mirror 51 Concave mirror
60 Silica-based optical waveguide
61 Optical fiber
62, 62a, 62b input/output connection waveguide
93, 93 Slab waveguide
64 Array waveguide
65 Output slab waveguide
101 Input optical fiber
102 Output optical fiber
103, 105, 401, 603 Convex lens
104 Diffraction grating
106a, 106b MEMS mirror
402, 604 Total reflection mirror
601 Spherical lens
602 Cylindrical lens

The invention claimed is:

1. An optical switch including at least one input port and at least one output port, comprising:
an optical demultiplexing element that demultiplexes an optical signal from the at least one input port into wavelength-separated optical signals;
at least one first optical deflection element that deflects the wavelength-separated optical signal incoming from the optical demultiplexing element to change a traveling direction thereof for each wavelength;
a second optical deflection element that deflects the optical signal incoming from the first optical deflection element to be output to at least one of the output ports; and
an optical multiplexing element that multiplexes the wavelength-separated optical signals incoming from the second optical deflection element,
wherein:
the first optical deflection element and the second optical deflection element deflect the incident optical signal in a switch axis direction perpendicular to a wavelength dispersion axis direction of the optical demultiplexing element and the optical multiplexing element,
the first optical deflection element and the second optical deflection element are formed of liquid-crystal elements each having phase distribution forming a curved surface in the switch axis direction, and
a beam waist of the optical signal exists in a position located midway between the first optical deflection element and the second optical deflection element in the switch axis direction.

2. The optical switch according to claim 1, wherein at least one of the first optical deflection element and the second optical deflection element includes a spatial phase modulation element having a plurality of microscopic phase modulation elements.

3. An optical switch including at least one input port and at least one output port, the optical switch comprising:
an optical demultiplexing element that demultiplexes an optical signal from the at least one input port into wavelength-separated optical signals;
at least one first optical deflection element that deflects the wavelength-separated optical signal incoming from the optical demultiplexing element to change a traveling direction thereof for each wavelength;
a second optical deflection element that deflects the optical signal incoming from the first optical deflection element to be output, to at least one of the output ports; and
an optical multiplexing element that multiplexes the wavelength-separated optical signals incoming from the second optical deflection element,
wherein:
the first optical deflection element and the second optical deflection element deflect the incident optical signal in a switch axis direction perpendicular to a wavelength dispersion axis direction of the optical demultiplexing element and the optical multiplexing element,
the first optical deflection element and the second optical deflection element are formed of liquid-crystal elements each reflecting the optical signal,
a reflecting surface of each of the first optical deflection element and the second optical deflection element has phase distribution forming a curved surface in the switch axis direction, and
a beam waist of the optical signal exists in a position located midway between the first optical deflection element and the second optical deflection element in the switch axis direction.

4. An optical switch including at least one input port and at least one output port, the optical switch comprising:
an optical demultiplexing element that demultiplexes an optical signal from the at least one input port into wavelength-separated optical signals;
at least one first optical deflection element that deflects the wavelength-separated optical signal incoming from the optical demultiplexing element to change a traveling direction thereof for each wavelength;
a second optical deflection element that deflects the optical signal incoming from the first optical deflection element to be output to at least one of the output ports; and
an optical multiplexing element that multiplexes the wavelength-separated optical signals incoming from the second optical deflection element,
wherein:
the first optical deflection element and the second optical deflection element deflect the incident optical signal in a switch axis direction perpendicular to a wavelength dispersion axis direction of the optical demultiplexing element and the optical multiplexing element,
each of the first optical deflection element and the second optical deflection element includes a MEMS mirror array with each mirror having a curvature in the switch axis direction, and
a beam waist of the optical signal exists in a position located midway between the first optical deflection element and the second optical deflection element in the switch axis direction.

5. The optical switch according to claim 1, comprising:
at least one first optical element that converts all of the optical signals incoming from the at least one input port into parallel light in the wavelength dispersion axis direction;
at least one second optical element that converts a shape of beam in all of the optical signals incoming from the at least one input port to form parallel light in the switch axis direction;
at least one third optical element that changes the optical signal incoming from the optical demultiplexing element to convergent light in the wavelength dispersion axis direction to form a beam waist on the first optical deflection element;
at least one fourth optical element that changes the optical signal incoming from the first optical deflection element to parallel light in the wavelength dispersion axis direction;
at least one fifth optical element that changes the optical signal incoming from the fourth optical element to convergent light in the wavelength dispersion axis direction to form a beam waist on the second optical deflection element;

at least one sixth optical element that changes the optical signal incoming from the second optical deflection element to parallel light in the wavelength dispersion axis direction;

at least one seventh optical element that converts all of the optical signals from the optical multiplexing element to convergent light in the wavelength dispersion axis direction, and converts a shape of beam to be coupled to at least one of the output ports; and at least one eighth optical element that converts all of the optical signals from the optical multiplexing element to allow a main light beam of the optical signal to converge in the switch axis direction for conversion of an optical path to be coupled to at least one of the output ports.

6. The optical switch according to claim 5, wherein:
each of the first optical deflection element and the second optical deflection element includes an optical deflection element that reflects the optical signal;
the third optical element is shared with the fourth optical element; and
the fifth optical element is shared with the sixth optical element.

7. The optical switch according to claim 6, comprising:
a ninth optical element that is placed between the third optical element shared with the fourth optical element and the fifth optical element shared with the sixth optical element to invert and reflect an image of the optical signal in the wavelength axis direction,
wherein the third optical element shared with the fourth optical element is also shared with the fifth optical element and the sixth optical element.

8. The optical switch according to claim 7, wherein the third optical element, the fourth optical element, the fifth optical element and the sixth optical element are formed of the same optical element reflecting the optical signal.

9. The optical switch according to claim 5, wherein the first optical element and the second optical element input each of the optical signals incident from the at least one input port into the optical demultiplexing element at the same angle.

10. The optical switch according to claim 5, wherein the first optical element, the second optical element, the third optical element, the fourth optical element, the fifth optical element and the sixth optical element each enter the optical signal to be sent to the at least one output port, into the optical multiplexing element at the same angle for the same wavelength.

11. The optical switch according to claim 1, wherein:
the at least one input port and the at least one output port are connected respectively to optical-beam forming devices including optical waveguides formed on a substrate;
the optical-beam forming device comprises:
    connection waveguides, the number of which is equal to the number of the input ports or the number of the output ports,
    a first slab waveguide connected to the connection waveguides,
    array waveguides connected to the first slab waveguide and having an optical path difference which is small to such an extent that interference characteristics in a signal wavelength band are negligible, and
    a second slab waveguide connected to the array waveguides;
a surface of the substrate is placed in a direction parallel to the switch axis; and
a length of the second slab waveguide in an optical axis direction is set in a fixed position from an output end of the optical waveguide.

12. The optical switch according to claim 1, wherein:
the at least one input port and the at least one output port are each connected to an optical-beam forming device including optical waveguides formed on a substrate;
the optical-beam forming device comprises:
    connection waveguides, the number of which is equal to the number of the input ports or the number of the output ports,
    a first slab waveguide connected to the connection waveguides,
    array waveguides connected to the first slab waveguide and having an optical path difference which is small to such an extent that interference characteristics in a signal wavelength band are negligible, and
    a second slab waveguide connected to the array waveguides;
a surface of the substrate is placed in a direction parallel to the switch axis; and
a boundary between the array waveguides and the second slab waveguide is formed of a curved surface.

13. The optical switch according to claim 11, wherein:
a connection point line between the connection waveguides and the first slab waveguide differs between an input optical beam forming device which is the optical beam forming device to which the input ports are connected, and an output optical beam forming device which is the optical beam forming device to which the output ports are connected; and
points constituting the connection point line in the output optical beam forming device are placed in a midpoint position between points of the connection point line in the input optical beam forming device.

14. The optical switch according to claim 12, wherein:
a connection point line between the connection waveguides and the first slab waveguide differs between an input optical beam forming device which is the optical beam forming device to which the input ports are connected, and an output optical beam forming device which is the optical beam forming device to which the output ports are connected; and
points constituting the connection point line in the output optical beam forming device are placed in a midpoint position between points of the connection point line in the input optical beam forming device.

* * * * *